United States Patent
Coleman et al.

(10) Patent No.: US 9,052,958 B2
(45) Date of Patent: Jun. 9, 2015

(54) EXTENDING THE CAPABILITY OF COMPUTING DEVICES BY USING DYNAMICALLY SCALABLE EXTERNAL RESOURCES

(75) Inventors: Victoria S. Coleman, Menlo Park, CA (US); Simon J. Gibbs, San Jose, CA (US); Doreen Cheng, San Jose, CA (US); Xinwen Zhang, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 930 days.

(21) Appl. No.: 12/559,394

(22) Filed: Sep. 14, 2009

(65) Prior Publication Data

US 2010/0131590 A1 May 27, 2010

Related U.S. Application Data

(60) Provisional application No. 61/117,082, filed on Nov. 21, 2008, provisional application No. 61/222,654, filed on Jul. 2, 2009, provisional application No. 61/222,855, filed on Jul. 2, 2009.

(51) Int. Cl.
*G06F 15/16* (2006.01)
*G06F 9/50* (2006.01)

(52) U.S. Cl.
CPC ........ *G06F 9/5044* (2013.01); *G06F 2209/509* (2013.01)

(58) Field of Classification Search
USPC ................................................ 709/203–204
See application file for complete search history.

(56) References Cited

U.S. PATENT DOCUMENTS

| | | | |
|---|---|---|---|
| 5,978,583 A | 11/1999 | Ekanadham et al. | |
| 6,298,481 B1* | 10/2001 | Kosaka et al. | 717/110 |
| 7,506,335 B1* | 3/2009 | Wooff et al. | 717/173 |
| 7,512,965 B1 | 3/2009 | Amdur et al. | |
| 7,698,708 B1* | 4/2010 | Lent et al. | 718/104 |
| 7,783,698 B2 | 8/2010 | Jain | |

(Continued)

FOREIGN PATENT DOCUMENTS

EP 2090983 8/2009

OTHER PUBLICATIONS

"*Adaptable Automation Engine*," rightscale.com, URL: http://www.rightscale.com/products/features/adaptable-automation-engine.php, downloaded on Jan. 8, 2010, 6 pages.

(Continued)

*Primary Examiner* — Minh-Chau Nguyen
(74) *Attorney, Agent, or Firm* — Sherman IP LLP; Kenneth L. Sherman; Hemavathy Perumal

(57) ABSTRACT

Techniques for extending the capabilities of computing environments and/or systems are disclosed. A scalable and dynamic external computing resource can be used in order to effectively extend the internal computing capabilities of a computing environment or system. The scalable and dynamic external computing resource can provide computing resources that far exceed the internal computing resources, and provide the services as needed, and in a dynamic manner at execution time. As a result, a computing device may function with relatively limited and/or reduced computing resources (e.g., processing power, memory) but have the ability to effectively provide as much computing services as may be needed, and provide the services when needed, on demand, and dynamically during the execution time.

42 Claims, 11 Drawing Sheets

(56) References Cited

U.S. PATENT DOCUMENTS

| | | | |
|---|---|---|---|
| 7,788,663 B2* | 8/2010 | Illowsky et al. | 717/177 |
| 7,886,021 B2* | 2/2011 | Scheifler et al. | 709/217 |
| 8,103,797 B2* | 1/2012 | Day | 709/248 |
| 8,196,133 B2* | 6/2012 | Kakumani et al. | 717/172 |
| 8,196,175 B2 | 6/2012 | Reed et al. | |
| 8,239,538 B2 | 8/2012 | Zhang et al. | |
| 2002/0010861 A1 | 1/2002 | Matsuyama et al. | |
| 2004/0054992 A1 | 3/2004 | Nair et al. | |
| 2005/0071828 A1 | 3/2005 | Brokenshire et al. | |
| 2005/0289266 A1* | 12/2005 | Illowsky et al. | 717/173 |
| 2006/0031681 A1 | 2/2006 | Smith et al. | |
| 2007/0061785 A1* | 3/2007 | Prakash | 717/127 |
| 2008/0016546 A1 | 1/2008 | Li et al. | |
| 2008/0082546 A1 | 4/2008 | Meijer et al. | |
| 2008/0209413 A1* | 8/2008 | Kakumani et al. | 717/172 |
| 2009/0089078 A1 | 4/2009 | Bursey | |
| 2009/0157419 A1 | 6/2009 | Bursey | |
| 2010/0043048 A1 | 2/2010 | Dolby et al. | |
| 2010/0192211 A1 | 7/2010 | Bono et al. | |
| 2010/0223385 A1 | 9/2010 | Gulley et al. | |
| 2010/0251339 A1 | 9/2010 | McAlister | |
| 2010/0332262 A1 | 12/2010 | Horvitz et al. | |
| 2010/0332530 A1 | 12/2010 | McKelvie et al. | |
| 2014/0074763 A1 | 3/2014 | Jeon et al. | |

OTHER PUBLICATIONS

André et al., "*Improvement of the QoS via an Adaptive and Dynamic Distribution of Applications in a Mobile Environment*,"SRDS-2000, Proceedings of the 19th IEEE Symposium on Reliable Distributed Systems, Oct. 16, 2000-Oct. 18, 2000, pp. 21-29.

"*Amazon Elastic Compute Cloud (Amazon EC2)*," Amazon Web Services, URL: http://aws.amazon.com/ec2/, downloaded on Jan. 5, 2010, 9 pages.

"*AppLogic—Grid Operating System for Web Applications*," 3tera.com, URL: http://www.3tera.com/AppLogic/, downloaded on Jan. 8, 2010, 1 page.

Barnett, Alex, "*Time to Define "Platform as a Service" (or PaaS)*," Alex Barnett Blog, posted Feb. 19, 2008, URL: http://alexbarnett.net/blog/archive/2008/02/19/time-to-define-quot-platform-as-a-service-quot-or-paas.aspx, downloaded on Jan. 8, 2010, 3 pages.

Chen et al., "*Studying Energy Trade Offs in Offloading Computation/Compliation in Java-Enabled Mobile Devices*," IEEE Transactions on Parallel and Distributed Systems, vol. 15, No. 9, Sep. 2004, pp. 795-809.

"*Cloud computing*," WikiPedia—The Free Encyclopedia, URL: http://en.wikipedia.org/wiki/Cloud_computing, Downloaded on Jan. 8, 2010, 7 pages.

"*Dynamic Appliances*," 3tera.com, URL: http://www.3tera.com/AppLogic/Dynamic-appliances.php, downloaded on Jan. 8, 2010, 2 pages.

"*Enomalism Elastic Computing Platform*," xensource.com, URL: http://wiki.xensource.com/xenwiki/Enomalism, downloaded on Jan. 8, 2010, 4 pages.

Hoge, Patrick, "*OnLive makes Internet video games splash*," San Francisco Business Times, URL: http://sanfrancisco.bizjournals.com/sanfrancisco/stories/2009/04/06/story13.html, Apr. 3, 2009, downloaded on Jan. 5, 2010, 3 pages.

"*How do I set up Autoscaling?*," rightscale.com, URL: http://support.rightscale.com/03-Tutorials/02-AWS/02-Website_Edition/How_do_I_set_up_Autoscaling%3f, downloaded on Jan. 8, 2010, 12 pages.

Le Mouël et al., "*AeDEn: An Adaptive Framework for Dynamic Distribution over Mobile Environments*," Annales de télécommuniucations, vol. 57—n°11-12/2002, 35 pages.

Le Mouël, Frédéric, "*Bibliography on Mobile Computing, Adaptive Systems and Distributed Computing*,"(mainly included in PhD Thesis Adaptive Distribution Environment for Applications in a Mobile Context), Nov. 7, 2008, URL: http://liinwww.ira.uka.de/bibliography/Distributed/mobile_computing.html, 43 pages.

"*Platform as a service*," WikiPedia—The Free Encyclopedia, URL: http://en.wikipedia.org/wiki/Platform_as_a_service, Downloaded on Jan. 8, 2010, 5 pages.

"*Product Overview*," Enomaly.com, URL: http://www.enomaly.com/Product-Overview.419.0.html, downloaded on Jan. 8, 2010, 2 pages.

"*RightScale Cloud Management Features*," rightscale.com, URL:http://www.rightscale.com/products/features/, downloaded on Jan. 8, 2010, 4 pages.

"*Software as a service*," WikiPedia—The Free Encyclopedia, URL:http://en.wikipedia.org/wiki/Software_as_a_service, Downloaded on Jan. 8, 2010, 4 pages.

Zhang et al., "*Securing Elastic Applications on Mobile Devices for Cloud Computing*,"Conference on Computer and Communications Security, Proceedings of the 2009 ACM workshop on Cloud Computing Security, Chicago, Illinois, USA, pp. 127-134.

Chun et al., "Augmented Smartphone Applications Through Clone Cloud Execution," HOTOS workshop (2009), URL: http://berkeley.intel-research.net/bgchun/clonecloud-hotos09.pdf , 5 pages.

Xian et al., "Adaptive Computation Offloading for Energy Conservation on Battery-Power Systems," 2007 International Conference on Parallel and Distributed Systems, Dec. 5-7, 2007, Hsinchu, vol. 2, pp. 1-8.

Balan et al., "Tatics-Based Remote Execution for Mobile Computing", Proceedings of the $1^{st}$ International Conference on Mobile Systems Applications and Services (MobiSys), San Francisco, CA May 5-8, 2003, 15 pages.

Narayannan et al, "Predictive Resource Management for Wearable Computing", Proceedings of the $1^{st}$ International Conference on Mobile Systems Applications and Services (MobiSys), San Francisco, CA 2003, pp. 113-128.

Yu et al., "Supporting Context-Aware Media Recommendations for Smart Phones", Pervasive Computing IEEE, vol. 5, Issue 3, pp. 68-75, Jul.-Sep. 2006.

"Naive Bayes Classifier", http://en.wikipedia.org/wiki/Naive_Bayes_classifier, No date.

Cohen et al., "Capturing, Indexing, Clustering, and Retrieving System History", $20^{th}$ ACM Symposium on Operting Systems Principles (SOSP 2005), 15 pages.

Cohen et al. "Correlating Instrumentation Data to System States: A Building Block for Automated Diagnosis and Control", (OSDI), Dec. 2004.

Hasan et al., "Please Permit Me: Stateless Delegated Authorization in Mashups," Computer Security Applications Conference, 2008. ACSAC 2008. Annual (2008), pp. 173-182.

Austel et al., "Secure Delegation for Web 2.0 and Mashups," W2SP 2008 Position Statement © 2008 IBM Corporation.

"Principle of least privilege," Wikipedia—The free encyclopedia, Jul. 23, 2010, http://en.wikipedia.org/wiki/Principle_of_least_privilege, 5 pages.

E. Hammer-Lahav, Ed., "The OAuth 1.0 Protocol," Internet Engineering Task Force (IETF), Apr. 2010, http://tools.ietf.org/pdf/rfc5849.pdf, 39 pages.

International Search Report and Written Opinion dated Mar. 3, 2010 from the International Application No. PCT/KR2009/006844 from Austrian Patent Office, pp. 1-7, Dresdner Strabe, Vienna, Austria.

Seydim, "Intelligent Agents: A Data Mining Perspective", Department of Computer Science and Engineering Southern Methodist University, May, 1999, pp. 1-19., United States.

Notice of Allowance dated Apr. 27, 2012 from U.S. Appl. No. 12/609,970.

Notice of Allowance dated Jun. 25, 2012 from U.S. Appl. No. 12/609,970.

Office Action dated Aug. 30, 2012 from U.S. Appl. No. 12/710,204.

Office Action dated Nov. 8, 2012 for U.S. Appl. No. 13/492,772.

U.S. Final Office Action mailed Dec. 10, 2012 from U.S. Appl. No. 12/710,204.

U.S. Non-Final Office Action dated Feb. 1, 2012 from U.S. Appl. No. 12/765,775.

Scerri, P. et al., "Are Multiagent Algorithms Relevant for Real Hardware? A Case Study of Distributed Constraint Algorithms", ACM, 2001, pp. 1-7, United States.

(56) References Cited

OTHER PUBLICATIONS

U.S. Notice of Allowance mailed Jun. 6, 2013 from U.S. Appl. No. 12/710,204.

U.S. Non-Final Office Action dated May 22, 2013 from U.S. Appl. No. 13/492,772.

U.S. Notice of Allowance dated Aug. 12, 2013 from U.S. Appl. No. 12/765,775.

U.S. Final Office Action dated Oct. 30, 2013 from U.S. Appl. No. 13/492,772.

U.S. Notice of Allowance dated Feb. 24, 2014 from U.S. Appl. No. 13/492,772.

* cited by examiner

EXTENDING THE CAPABILITY OF COMPUTING DEVICES BY USING DYNAMICALLY SCALABLE EXTERNAL RESOURCES

CROSS-RELATION TO RELATED APPLICATION

This application claims priority to provisional patent application Ser. No. 61/117,082, entitled "EXTENDED AND/OR ADJUSTABLE COMPUTING SYSTEMS USING ABSTRACT AND/OR CONCEALED COMPUTING SERVICE PROVIDERS," filed Nov. 21, 2008, provisional patent application Ser. No. 61/222,654, entitled "EXTENDING THE CAPABILITY OF COMPUTING DEVICES BY USING ABSTRACT AND DYNAMICALLY SCALABLE EXTERNAL RESOURCES," filed Jul. 2, 2009, and provisional patent application Ser. No. 61/222,855, entitled "SECURING ELASTIC APPLICATIONS ON MOBILE DEVICES FOR CLOUD COMPUTING," filed Jul. 2, 2009, which are all hereby incorporated herein by reference in their entirety and for all purposes.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information is stored in a computer readable medium in a binary form. More complex computing systems can store content including the computer program itself. A computer program may be invariable and/or built into, for example, a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS), which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops, and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers.

Another more recent trend is the ever increasing accessibility of the Internet and the services that can be provided via the Internet. Today, the Internet can be accessed virtually anywhere by using various computing devices. For example, mobile phones, smart phones, datacards, handheld game consoles, cellular routers, and numerous other devices can allow users to connect to the Internet from anywhere in a cellular network. Within the limitations imposed by the small screen and other limited and/or reduced facilities of a pocket-sized or handheld device, the services of the Internet, including email and web browsing, may be available. Typically, users manage information with web browsers, but other software can allow them to interface with computer networks that are connected to or by the Internet. These other programs include, for example, electronic mail, online chat, file transfer and file sharing. Today's Internet can be viewed as a vast global network of interconnected computers, enabling users to share information along multiple channels. Typically, a computer that connects to the Internet can access information from a vast array of available servers and other computers by moving information from them to the computer's local memory. The Internet is a very useful and important resource as readily evidenced by its ever increasing popularity and widening usage and applications.

The popularity of computing systems is evidenced by their ever increasing use in everyday life. Accordingly, techniques that can improve computing systems would be very useful.

SUMMARY OF THE INVENTION

Broadly speaking, the invention relates to computing systems and computing environments. More particularly, the invention pertains to techniques for extending the capabilities of computing environments and/or computing systems.

In accordance with one aspect of the invention, one or more computing resource providers (e.g., scalable and dynamic external computing resources) can be used in order to effectively extend the computing capabilities beyond that which can be provided by internal computing resources of a computing system or environment. It will be appreciated that a scalable and dynamic external computing resource can provide computing resources that far exceed (e.g., by a factor of at least ten (10)) the internal computing resources of a computing system and/or environment (e.g., computing device). As a result, a computing system may function with relatively limited and/or reduced computing resources (e.g., processing power, memory) but have the ability to effectively provide as much computing services as may be needed and provide the services when needed, on demand, and dynamically during the execution time.

In accordance with one embodiment of the invention, a computing system (e.g., a computing device) can be operable to determine, during runtime of executable computer code, whether to execute (or continue to execute) one or more portions of the executable computer code by effectively using a dynamically scalable computing resource as an external computing resource. The computing system can determine the relative extent of allocation of execution of the executable computer code between internal computing resources and the external computing resources of the dynamically scalable computing resource in a dynamic manner at runtime (e.g., during load time, after load time before execution time, execution time) and allocate the execution accordingly. It should be noted that the computing system can also be operable to effectively migrate, during runtime, execution of one or more portions of executable code from the computing system to a computing resource provider, and/or vice versa.

In accordance with another embodiment of the invention, a computing device can be operable to effectively use a scalable and dynamically scalable resource for execution of at least a first part (or portion) of executable computer code. The computing device may also be operable to use its internal computing resources to execute a second part (or portion) of executable computer code. Nevertheless, the computing device can provide the output of the executions of both the first and second parts of the executable computer code result, thereby making the collective result of the execution available on the computing system. It should be noted that the computing device can be operable to use a dynamically scalable resource as an abstract resource. By way of example, an Abstract and Dynamically Scalable Computing Resource (ADSCR) can be accessed using an abstract interface. Those skilled in the art will appreciate that the ADSCR, can for example, be a "Cloud" computing resource operable to deliver dynamically scalable computing resources via an abstract interface as Web-services over the Internet.

In accordance with yet another embodiment of the invention, a computing device can be operable to initiate execution of at least a first portion of executable computer code by its internal computing resources. Moreover, before the execution of the first portion has completed, the computing device can facilitate, initiate, cause, and/or resume execution of at least a second portion of the executable computer code by using one or more external computing resources of an ADSCR, thereby allowing the computing device to effectively extend its internal computing capabilities by using external computing capabilities that can be delivered dynamically at execution time.

The invention can be implemented in numerous ways, including, for example, a method, an apparatus, a computer readable (and/or storable) medium, and a computing system (e.g., a computing device). A computer readable medium can, for example, include and/or store at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
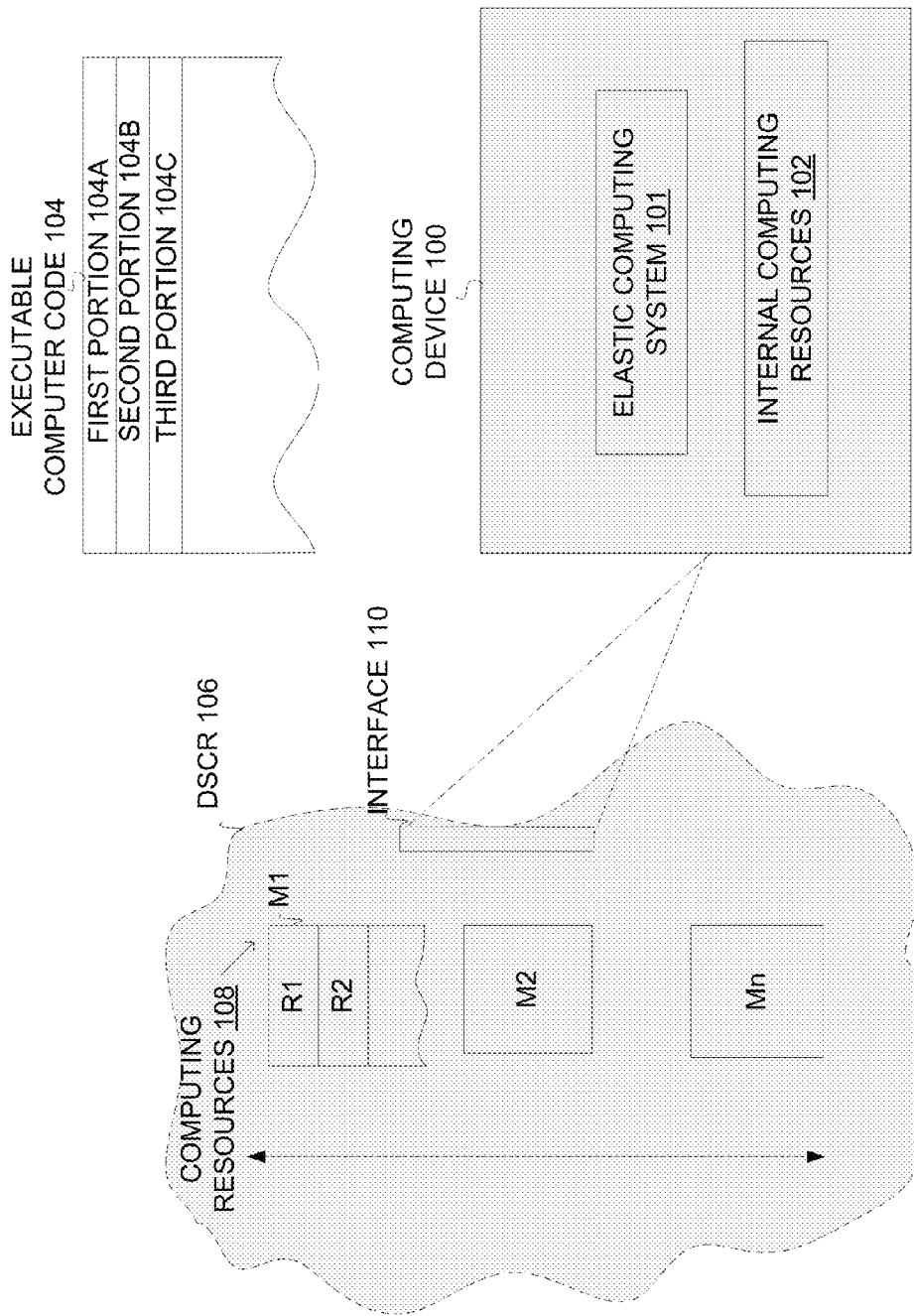
FIG. 1A depicts a computing device in accordance with one embodiment of the invention.

As noted in the background section, computing environments and systems are very useful. Today, various computing devices have become integrated in every day life. In particular, portable computing devices are extremely popular. As such, extensive efforts have been made to provide cheaper and more powerful portable computing devices. In addition, it is highly desirable to provide modern Consumer Electronic (CE) devices with extensive computing capabilities. However, conventional computing environments and techniques are not generally suitable for providing modern portable and CE computing devices. In other words, conventional computing environments provided for more traditional computing devices (e.g., Personal Computers, servers) can be relatively complex and/or expensive and not generally suitable for modern CE computing devices, especially for a CE device intended to operate with limited and/or reduced resources (e.g., processing power, memory, battery power) and/or provide other functionalities, for example, mobile phones. In some cases, the computing capabilities of a CE device would serve as a secondary functionality (e.g., televisions, refrigerators, etc.). As such, it is not very desirable to use a relatively complex and expensive computing environment in order to provide modern CE devices with extensive computing capabilities.

In view of the foregoing, improved computing environments are needed. It will be appreciated that the invention provides improved computing environments and computing techniques.

In accordance with one aspect of the invention, one or more computing resource providers (e.g., scalable and dynamic external computing resources) can be used in order to effectively extend the computing capabilities beyond that which can be provided by internal computing resources of a computing system or environment. It will be appreciated that a scalable and dynamic external computing resource can provide computing resources that far exceed (e.g., by a factor of at least ten (10)) the internal computing resources of a computing system and/or environment (e.g., computing device). As a result, a computing system may function with relatively limited and/or reduced computing resources (e.g., processing power, memory) but have the ability to effectively provide as much computing services as may be needed and provide the services when needed, on demand, and dynamically during the execution time.

In accordance with one embodiment of the invention, a computing system (e.g., a computing device) can be operable to determine, during runtime of executable computer code, whether to execute (or continue to execute) one or more portions of the executable computer code by effectively using a dynamically scalable computing resource as an external computing resource. The computing system can determine the relative extent of allocation of execution of the executable computer code between internal computing resources and the external computing resources of the dynamically scalable computing resource in a dynamic manner at runtime (e.g., during load time, after load time before execution time, execution time) and allocate the execution accordingly. It should be noted that the computing system can also be operable to effectively migrate, during runtime, execution of one or more portions of executable code from the computing system to a computing resource provider, and/or vice versa.

In accordance with another embodiment of the invention, a computing device can be operable to effectively use a scalable and dynamically scalable resource for execution of at least a first part (or portion) of executable computer code. The computing device may also be operable to use its internal computing resources to execute a second part (or portion) of executable computer code. Nevertheless, the computing device can provide the output of the executions of both the first and second parts of the executable computer code result, thereby making the collective result of the execution available on the computing system. It should be noted that the computing device can be operable to use a dynamically scalable resource as an abstract resource. By way of example, an ADSCR can be accessed using an abstract interface. Those skilled in the art will appreciate that the ADSCR, can for example, be a "Cloud" computing resource operable to deliver dynamically scalable computing resources via an abstract interface as Web-services over the Internet.

In accordance with yet another embodiment of the invention, a computing device can be operable to initiate execution of at least a first portion of executable computer code by its internal computing resources. Moreover, before the execution of the first portion has completed, the computing device can facilitate, initiate, cause, and/or resume execution of at least a second portion of the executable computer code by using one or more external computing resources of an ADSCR, thereby allowing the computing device to effectively extend its internal computing capabilities by using external computing capabilities that can be delivered dynamically at execution time.

Embodiments of these aspects of the invention are discussed below with reference to FIGS. 1A-4D. However, those skilled in the art will readily appreciate that the detailed description given herein with respect to these figures is for explanatory purposes as the invention extends beyond these limited embodiments.

FIG. 1A depicts a computing device (or computing system) 100 in accordance with one embodiment of the invention. Referring to FIG. 1A, the computing device 100 can effectively use one or more of its computing resources ("internal computing resources") 102 to perform various computing tasks, including loading and execution of executable computer code 104 (e.g., a computer application program). As will be known to those skilled in the art, the internal computing resources 102 can, for example, include one or more processors, memory, non-volatile memory, storage memory, RAM memory, a computer readable storage medium storing executable computer code, and so on. The executable computer code 104 can, for example, be stored partly or entirely by the internal computing resources 102 of the computing device 100, stored on one or more other devices including various storage devices (e.g., a Compact Disk) and/or be distributed among various entities including server computing systems (or servers) and various storage facilities. Generally, the executable computer code 104 can be stored in a computer readable storage medium provided for the computing device 100 and/or another entity. As such, the computing device 100 can be operable to store at least a first portion 104A of the executable computer code 104 internally and for execution by its internal computing resources 102.

Moreover, it will be appreciated that the computing device 100 can be operable to effectively facilitate and/or cause execution of the executable computer code 104 by a Dynamically Scalable Computing Resource (DSCR) 106 that can provide scalable computing resources on-demand and as need by the computing device 100, in a dynamic manner. As such, the computing device 100 can be operable to use the internal computing resources 102, as well as one or more (external) computing resources ("external computing resources") 108 of the DSCR 106. In other words, the computing device 100 can be operable to effectively use both internal computing resources 102 and external computing resources 108 in order to effectively facilitate, initiate, resume and/or cause execution of various portions (or parts) of the executable computer code 104 (e.g., a first and second portions 104A and 104B can be executed using respectively internal and external computing resources 102 and 106).

More particularly, the computing device 100 can effectively provide an Elastic Computing System (ESC) 101 operable to effectively extend the internal computing resources 102 by utilizing (or effectively using) the external computing resources 108 of the DSCR 106. It should be noted that DSCR 106 can effectively provide a layer of abstraction so that the ESC 101 need not specifically address a specific computing resource (e.g., a computing resource R1 of a computing device of Machine M1) or "know" the identity of a specific machine (or device) M1 that executes the second portion 104B of the executable computer code 104 on behalf of the computing device 100. As such, the DSCR 106 can be provided as an ADSCR 106, as will be appreciated by those skilled in the art. As a result, the ESC 101 can be operable to effectively use the computing resources of various entities including, for example, Machine 1 (M1) and Machine 2 (M2) of the ADSCR 106 by addressing an interface 110, whereby the computing resources 108, and/or services provided by them, can be effectively abstracted from the computing device 100.

It will also be appreciated that the ESC 101 can be operable to determine, during the runtime of the executable computer code 104, whether to execute or continue to execute one or more portions of the executable computer code 104 by effectively using the DSCR 106, thereby dynamically determining during runtime, relative extent of allocation of execution of the executable computer code 104 between the internal computing resources 102 of the computing system 100 and external computing resources 108 of the DSCR 106. Based on this determination of relative extent of allocation of execution, the ESC 101 can also be operable to effectively use the one or more external resources 108 of the DSCR 106 for execution of one or more portions of the executable computer code 104. In other words, the ESC 101 can cause the execution of one or more portions of the executable computer code 104 when it determines to execute one or more portions of the executable computer code 104 by effectively using one or more of the external resources 108 of the DSCR 106.

It should be noted that the determination of the relative extent of allocation of execution of the executable computer code 104 can, for example, occur when one or more portions of the executable computer code 104 is to be loaded for execution, one or more portions said executable computer code 104 is to be executed, one or more portions of the executable computer code 104 is being executed by one or more of the internal computing resources 102, one or more portions the executable computer code 104 is being executed by the external computing resources 108. Generally, this determination can be made during runtime when executable computer code 104 is to be loaded for execution, or is to be executed (e.g., after it has been loaded but before execution), or is being executed.

It should also be noted that determination of the relative extent of allocation of execution of the executable computer code 104 can be performed by the ESC 101, without requiring user input, thereby automatically determining the relative extent of allocation of execution of the executable computer code 104 between said one or more internal computing resources 102 and one or more external resources 108. However, it should be noted that the ESC 101 may be operable to make this determination based on one or more preferences that can, for example, be provided as set of predetermined user-defined preferences (e.g., minimize power or battery usage, use internal resources first, maximize performance, minimize monetary cost). The ESC 101 may also be operable to make the determination of the relative extent of allocation of execution of the executable computer code 104 based on input explicitly provided by a user at runtime. By way of example, the ESC 101 may be operable to request user input and/or user confirmation prior to allocation of execution to the DSCR 106.

This determination can, for example, be made based on one or more capabilities the internal computing resources 102, monetary cost associated with using the external resources 108, expected and/or expectable latency for delivering services by the external resources 108, network bandwidth for communication with the DSCR 106, status of one or more physical resources, battery power of the computing system 100, one or more environmental factors, physical location of the computing system 100, number and/or types of applications being executed on the computing system 100, type of applications to be executed.

It will be appreciated that the ESC 101 can be operable to determine the relative extent of allocation of execution of the executable computer code 104 between the internal and external computing resources 102 and 108 without requiring code developers to explicitly define the extent of the allocation. In other words, the ESC 101 can determine the extent of execution allocation to external computing resources 108 and make the allocation accordingly without requiring the executable computer code 104 to effectively provide any instructions with respect to allocation of execution between the internal and external computing resources 102 and 108. As a result, computer application developers need not develop applications that explicitly define allocation between internal and external computing resources of a computing system or a device. It should be noted that the developer can explicitly identify code portions (or code fragments) to be allocated for execution using internal and external computing resources. However, the ESC 101 can determine which of the code portions are to be executed by internal or external computing resources.

It will also be appreciated that the ESC 101 can be operable to effectively increase and/or decrease the extent of the effective use of the one or more external resources 108 of the DSCR 106 during runtime of the executable computer code 104, thereby effectively providing dynamic elasticity to modify and/or adjust the extent of allocation of execution to execute more of less portions of the executable computer code 104 during runtime. The one or more portions of the executable computer code 104 can be relocate and/or replicable code, as will be appreciated by those skilled in the art. Moreover, the ESC 101 can be operable to effectively relocate one or more re-locatable and/or replicable code portions 104 from the computing system 100 to the DSCR 106, or vice versa, during runtime of the executable computer code 104.

In other words, the computing device 100 can be operable to vary the extent of execution allocation of the executable computer code 104, during run time, between various allocation stages. These allocation stages include: (i) an internal allocation stage when the executable computer code 104 is executed entirely and/or using only the internal computing resources 102, (ii) a split allocation stage when the executable computer code is executed using both internal and external computing resources 102 and 108, and (iii) an external allocation stage when the executable computer code 104 is executed entirely and/or using only the external computing resources 108. As such, the computing device 100 can be operable to vary the extent of execution allocation of the executable computer code 104, during run time, to provide "vertical" elasticity between the internal computing resources 102 and the external computing resources 108 of the DSCR such that executable computer code 104 is executed using only the internal computing resources 103 or is "split" between the internal and external computing resources 102 and 108 so that at least a first executable portion 104A is executed using internal computing resources 102 and at least a second executable portion 104B is executed using the external computing resources 108.

In addition, it should be noted that the ESC 101 can be operable to cause execution of at least two portions of said executable code respectively on two nodes (e.g., machines M1 and M2) of the DSCR 106. By way of example, the ESC 101 can be operable to cause execution of at least two processes associated with the executable computer code 104 respectively on two separate computing nodes of the executable computer code 104.

In view of the foregoing, it will be apparent the ESC 101 allows the computing device 100 to effectively extend its computing capabilities beyond its internal computing capabilities effectively defined based on the capabilities of the internal computing resources 102. As such, the computing device 100 need not be bound by the limits of its internal computing capabilities but may be bound by the limits of the external computing resources of the DSCR 106 which may be relatively and/or virtually unlimited with respect to the internal computing resources 102. As a result, the computing device may be provided with very limited, reduced and/or cheap internal resources but be operable to effectively provide computing capabilities that are bound only by the virtually limitless external resources of dynamically saleable resources (e.g., a "Cloud" Computing Resources capable of providing virtually as much computing capabilities as may be desired by a single computing device).

It will also be appreciated that the ESC 101 can be operable to cause execution of the one or more portions of the executable computer code 104 by one or more external resources 108 without copying any operating environment (e.g., an operating system, an image) of the computing device 100 which is operable to execute the one or more portions of the executable computer code 104 on the computing device 100.

The ESC 101 can be operable to obtain (e.g., generate, receive) a first output data as a result of the execution of the first executable computer code portion 104A by the internal computing resources 102. In addition, the ESC 101 can be operable to obtain second output data as a result of the execution of the second portion 104B of the executable computer code 104. This means that the first and second output data associated respectively with the execution of the first and second portions (104A and 104B) can both be made available as a collective result of the executable computer code 104. As a result, the computing device 100 can provide execution output (e.g., computing services) in a similar manner as would be provided had the execution been performed using only the internal computing resources 102. It should be noted that the ESC 101 can be operable to effectively facilitate, initiate, resume and/or cause execution of one or more portions of the executable computer code 104 by using one or more external computing resources 108 of the DSCR 106, or by facilitating, initiating, resuming and/or causing the execution by the DSCR 106 (i.e., causing the DSCR to execute the executable computer code 104 using its computing resources 108). An external computing resource 108 (e.g., R1 and R2) may, for example, provide both the processing power and memory needed to execute one or more portions of the executable computer code 104, or support the execution by providing only memory or only processing power required for execution.

In general, the ESC 101 can be operable to effectively request computing services from the DSCR 106. As a dynamically scalable resource provider, the DSCR 106 can provide computing resources on demand and to the extent needed during execution time so that it can execute at least both first and second portions (104A and 104B) of the executable computer code 104. It will be appreciated that the computing resources of the DSCR 106 can far exceed the internal computing resources 102 of the computing device 100. By way of example, the computing device 100 can be a computing device with relatively limited and/or reduced computing resources 102 in comparison to a "Cloud" computing resource (106) that can provide scalable computing resources, including processing power and memory, dynamically and on demand, to the extent requested by the ESC 101 of the computing device 100.

A "Cloud" computing resource is an example of a dynamically scalable computing resource capable of providing computing services over the Internet and using typically virtualized computing resources, as will be readily known to those skilled in the art. Generally, using a dynamically scalable external resource, the ESC 101 can effectively provide a virtual device with computing capabilities far exceeding its relatively limited and/or reduced internal computing resources 102.

It should also be noted that the ESC 101 can effectively use the dynamic scalability of the DSCR 106 in order to provide a dynamically adaptable device capable of effectively providing computing services on the demand and as needed. As such, the ESC 101 can be operable to effectively switch between internal computing resources 102 and external computing resources 108 at run time during the execution of the executable computer code 104. By way of example, the ESC 101 can be operable to cause execution of a third portion 104C of the executable computer code 104 by the DSCR 106 after initiating or causing execution of the first or second portions (104A and 104B) of the executable computer code 104 and possibly while the first and/or second portions (104A and 104B) of the executable computer code 104 are being executed. As another example, the ESC 101 can be operable to execute or resume execution of the second portion 104B of the executable computer code 104 using the internal computing resources 102 after effectively initiating or causing execution of the second portion 104B of the executable computer code 104 on the DSCR 106. As yet another example, the ESC 101 can be operable to effectively facilitate, cause, or resume execution of a first portion 104A by the DSCR 106 after initiating the execution of the first portion 104A and while it is still being executed on the internal computing resource 102.

Generally, the ESC 101 can be operable to determine whether to execute at least a portion of the executable computer code 104 using an external computing resource such as the external computing resources 108 provided by the DSCR 106. Those skilled in the art will appreciate that this determination can be made based on various factors including, for example, one or more of the following: capabilities of the internal computing resources 102, the monetary cost associated with external resources, expected and/or expectable latency for delivering services, network bandwidth, status of physical resources (e.g., current battery power), environmental factors (e.g., location).

The ESC 101 can also be operable to coordinate the internal and external execution activities. By way of example, the ESC 101 can be operable to effectively coordinate execution of a first executable code portion 104A using internal computing resources 102 with the execution of a second executable code portion 104B using DSCR 106, thereby effectively using both internal and external computing resources to execute said executable computer code in a coordinated manner. As part of the coordination activities, the ESC 101 can be operable to obtain first and second output data respectively for the first and second executable code portions as a collective result, thereby making available on the ESC 101 both the first and second output data as a collective result of execution of the executable computer program code 104. It will be appreciated that the ESC 101 can provide the collective result as if the entire executable code 104 has been executed using internal computing resources 102. A user of the ESC 101 need not be aware that external computing resources are being used and computing service can be delivered in a meaningful way. In addition, ESC 101 allows development and execution of the same executable computer code (e.g., a computer Application Program) for various devices ranging from those that may have very limited and/or reduced computing resources to those with very extensive computing resources, thereby enhancing the software development process and maintenance.

In view of the foregoing, it will readily be appreciated that the computing device 100 can, for example, be a Consumer Electronic (CE) device, a mobile device, a handheld device, a home appliance device (a Television, a refrigerator) with relatively limited and/or reduced built in computing resources. Moreover, it will be appreciated that ESC 101 is especially suitable for CE and/or mobile devices with general characteristics that include limited and/or reduced computing resources and/or power, varying communication speed, quality and/or responsiveness to the user.

Figure 1B:
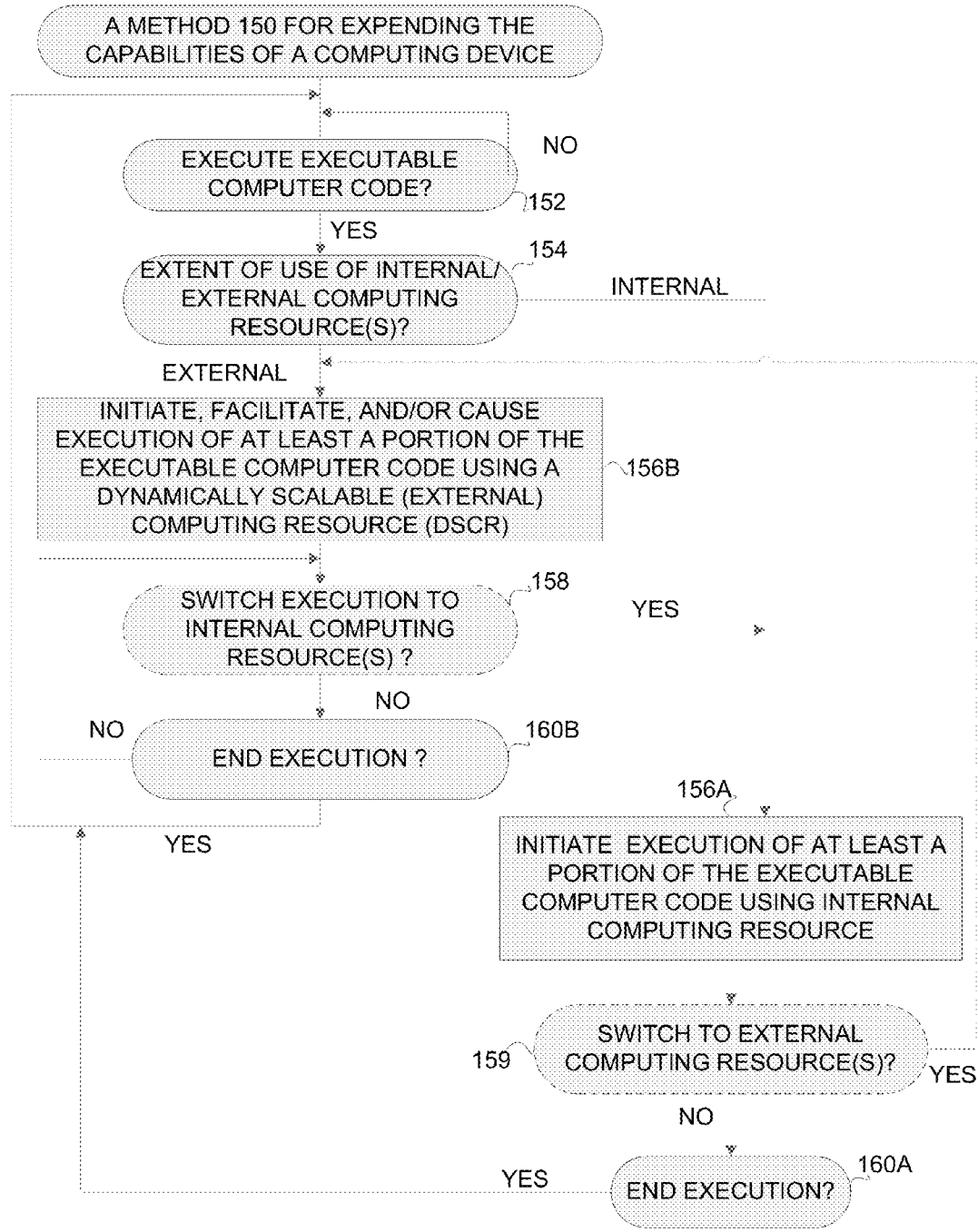
FIG. 1B depicts a method for extending (or expanding) the internal capabilities of a computing device in accordance with one embodiment of the invention.

FIG. 1B depicts a method 150 for extending the capabilities (or extending the internal capabilities) of a computing device in accordance with one embodiment of the invention. Method 150 can, for example, be performed by the computing device 100 depicted in FIG. 1A.

Referring to FIG. 1B, initially, it is determined (152) whether to execute executable computer code. In effect, the method 150 can wait until it is determined (152) that executable computer code is to be executed. If it is determined (152) to execute executable computer code, the method 150 can proceed to determine whether to use external computing resources and/or the extent of respective use of internal and external computing resources in order to execute the executable computer code. As a result, execution of at least a portion of the executable computer code can be initiated (156B) using one or more internal computing resources of the computing device (or a particular computing environment or computing system). In addition, execution of at least a portion of the executable computer code can be initiated, facilitated and/or caused (156B) using a DSCR. In other words, one or more computing resources of a DSCR can be effectively requested to be provided to the computing device as one or more external resources. Those skilled in the art will readily appreciate that generally, execution (156A and 156B) can be initiated using internal and external computing resources (156A and 156B) substantially in parallel or virtually at the same time. Furthermore, it will be appreciated that execution of various portions of the executable computer code can effectively switch between internal and external computing resources. Referring back to FIG. 1B, it can optionally be determined (158) whether to switch execution of one or more portions of executable computer code from an external computing resource, namely, a DSCR, to one or more internal computing resources. As a result, execution of a portion of the executable computer code can be initiated using an external computing resource but later moved and/or resumed using an internal computing resource. Similarly, it can optionally be determined (159) whether to switch execution of one or more portions of the executable computer code from one or more internal computing resources to one or more external computing resources and the usage of computing resources can be changed accordingly.

It should be noted that execution of executable computer code using respectively internal and external computing resources can end if it is determined to end (160A) execution using internal computing resources or end (160B) execution using external computing resources. The method 150 can proceed in a similar manner to execute executable computer code using internal and/or external computing resources while allowing usage of these resources to be adjusted during execution time in a dynamic manner, as depicted in FIG. 1B.

Figure 1C:
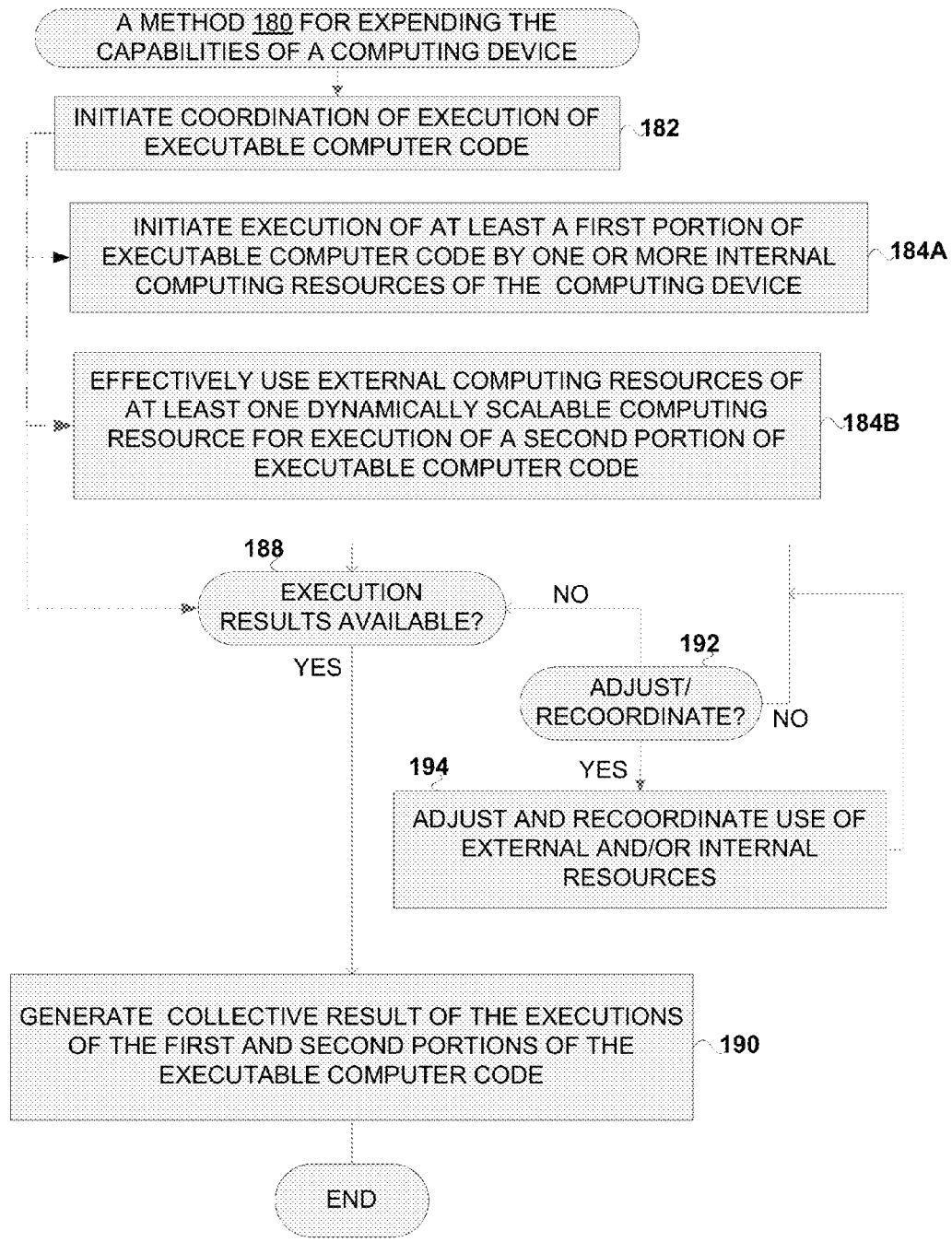
FIG. 1C depicts a method for extending (or expanding) the capabilities of a computing device in accordance with another embodiment of the invention.

FIG. 1C depicts a method 180 for extending the capabilities (or extending the internal capabilities) of a computing device in accordance with another embodiment of the invention. Method 180 can, for example, be performed by the computing device 100 depicted in FIG. 1A. Referring to FIG. 1C, initially, coordination (182) of execution of executable code is initiated. Generally, this coordination (182) can coordinate use of internal and external computing resources. In other words, coordination between use of internal and external computing resources for executing executable computer program code can be initiated. Typically, the coordination (182) coordinates: (a) execution or execution related activities using internal computing resources, and (b) execution or execution related activities using external computing resources. The internal computing resources can be provided by the computing device and external computing resources can be provided by a dynamically scalable computing resource.

Referring back FIG. 1C, two exemplary operations that can be coordinated (182) are depicted. A first operation is depicted as initiating (184A) execution of at least a first portion of executable computer code by or using one or more internal computing resources of a computing device. A second operation is depicted as effectively using (184B) external computing resources of a least one DSCR for execution of a second portion of the executable code. Those skilled in the art will readily appreciate that these exemplary operations (184A and 184B) can be initiated in various orders or in parallel.

As a part of this coordination (182), the coordination (182) can determine when to initiate each of the exemplary operations (184A and 184B), and initiate them accordingly. In effect, the coordination (182) can continue to effectively coordinate (a) execution of the first portion of executable computer code using internal computing resources with (b) execution of the second portion of executable computer code using external computing resources of a DSCR.

Those skilled in the art will appreciate that the coordination (182) can, for example, include: generating a first output for execution of the first portion of the executable computer code by using internal computing resources, and obtaining a second execution result as a result of execution of the second portion of the executable computer code by one or more external computing resources. Referring back to FIG. 1C, as a part of the coordination (182), it can be determined (188) whether the results of the executions (184A and 184B) are available. Accordingly, a collective result of the execution of the first and second portions of the code can be generated (190) as a part of the coordination (182). It should be noted that the collective result may be presented by the computing device and/or made available by the computing system.

However, if it is determined (188) that the results of the executions are not available, it can be determined (192) whether to adjust and/or re-coordinate the execution of the executable computer code. Accordingly, the execution of the executable computer can be dynamically adjusted and/or re-coordinated (194). By way of example, execution of the second code portion can be reinitiated using the same external computing resource, it can be initiated using a different external computing resource, or it can be switched to an internal resource. In addition, error handling and/or error recovery may also be performed.

Those skilled in the art will appreciate that coordinating (182) or re-coordinating (194) can, for example, also include: determining when to effectively initiate execution of executable computer code using an internal or external computing resources, selecting a DSCR from a set of DSCR's, and selecting one or more external resources (e.g., a specific type of resource, a specific resource among other similar resources). Other examples include: determining a location for sending a request for execution of executable computer code (or a portion thereof), sending to the determined location a request for the execution of the executable computer code, and obtaining from the location the execution result.

Figure 1D:
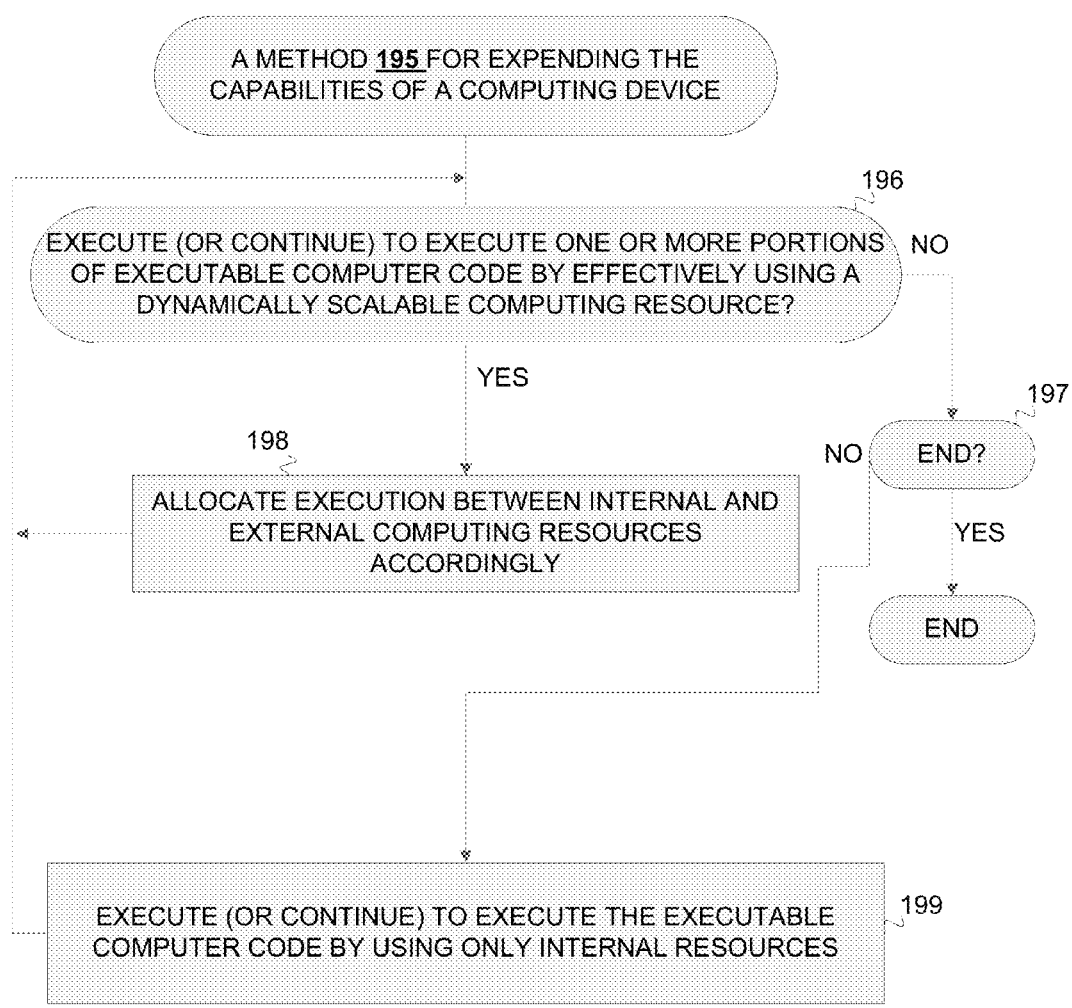
FIG. 1D depicts a method for executing executable computer code in accordance with another embodiment of the invention.

FIG. 1D depicts a method 195 for execution of executable computer code in accordance with one embodiment of the invention. Method 195 can, for example, be performed by the computing device 100 depicted in FIG. 1A. Initially, it is determined (196) whether to execute or continue to execute one or more portions of executable computer code by effectively using a dynamically scalable computing resource. The determination (196) can, for example, be determined at runtime, thereby dynamically determining the relative extent of allocation of execution of the executable computer code between internal and external computing resources computing resources. If it is determined (196) not to execute or not to continue to execute at least one portion of the executable computer code, it is determined (197) whether to end (or not initiate) execution of the executable computer code. Consequently, the method 195 can end or result in execution (199) of the executable computer code by using only internal computing resources. Thereafter, the method 195 proceeds to determine (196) whether to execute one or more portions of executable computer code by effectively using a dynamically scalable computing resource. As a result, allocation of execution may be adjusted to use external resources.

In particular, if it is determined (196) to execute or continue to execute at least one portion of the executable computer code by effectively using a dynamically scalable computing resource, the method 195 proceeds to allocate (198) execution between internal and external computing resources accordingly. After execution of the executable computer code has been allocated accordingly, method 195 proceeds to determine (196) whether to execute one or more portions of executable computer code by effectively using a dynamically scalable computing resource. In effect, the allocation of execution may be adjusted to allocate more or less of the execution of the executable computer code to the external resources. Method 195 ends if it is determined (197) to end execution of the executable computer code or if it is determined (197) not to execute the executable computer code.

As noted above, the Elastic Computing System (ESC) (e.g., ESC 101 shown in FIG. 1A) can effectively extend the internal (or physical) computing resources of a computing device, thereby extending the internal computing capabilities of the computing device. As a result, a virtual device with extensive computing capabilities can be effectively built using a device with relatively limited and/or reduced capabilities. It should be noted that the internal computing capabilities of the computing device can be extended at runtime in a dynamic manner.

Figure 2:
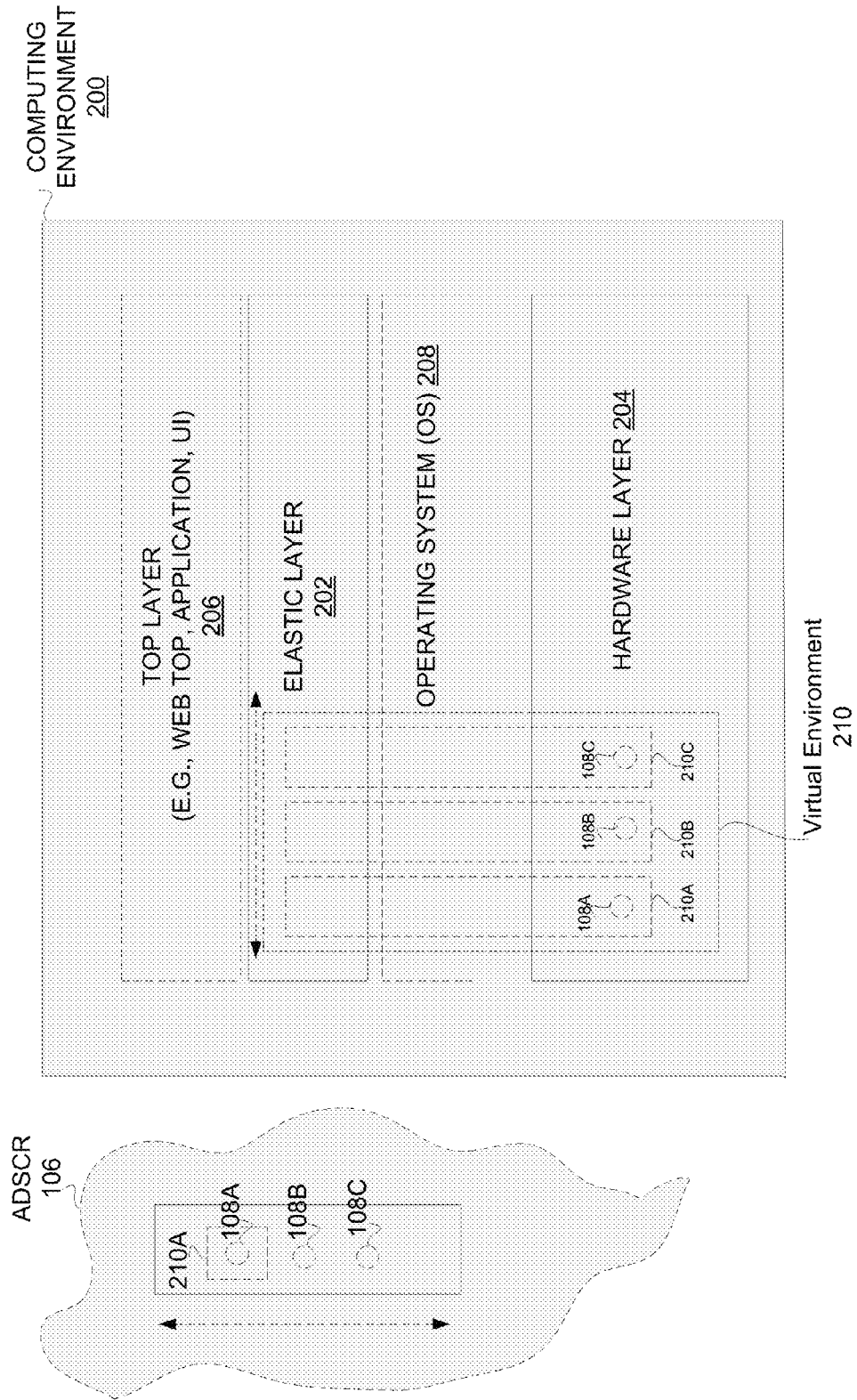
FIG. 2 depicts a computing environment in accordance with one embodiment of the invention.

To further elaborate, FIG. 2 depicts a computing environment 200 in accordance with one embodiment of the invention. The computing environment 200 can, for example, be provided by and/or for the computing device 100 depicted in FIG. 1A.

Referring to FIG. 2, an Elastic Layer (component or module) 202 can be provided for a hardware layer 204. The Elastic Layer (EL) 202 may interface with an optional top layer 206 that can, for example, include a User Interface (UI), a Web Top (WT) layer, or an application layer. As shown in FIG. 2, an optional Operating System (OS) layer 208 may also reside between the Elastic Layer (EL) 202 and the hardware layer 204, as will be appreciated by those skilled in the art. Moreover, those skilled in the art will appreciate that a Virtual Environment (VE) 210 (e.g., a Run Time Environment (RTE) 210) can be provided by the Elastic Layer (EL) 202 to effectively extend the physical hardware layer 204 and its capabilities. Referring to FIG. 2, the Elastic Layer (EL) 202 can be operable to effectively initiate and/or instantiate one or more instances of a VE 210 on demand and as needed. For example, an individual RTE instance 210A can be initiated for execution of a particular part or portion of executable computer code (e.g., an application component, an Applet, a Weblet). The Elastic Layer (EL) 202 can be operable to effectively initiate or cause initiation of a virtual computing environment by the ADSCR 106.

In effect, a computing resource 108A of the ADSCR 106 can be provided by an RTE instance 210A as if the physical computing resource 108A is present in the hardware layer 204. The RTE 210 allows effectively extending the resource 108A to the Computing Environment 200. Those skilled in the art will appreciate that the RTE can, for example, be provided to a virtual computing environment on the ADSCR 106 and/or the computing environment 200. The Elastic Layer (EL) 202 can initiate RTE instances 210 as needed and consequently be provided with the computing resources of the ADSCR 106 on demand and in a dynamic manner at runtime (or during the execution of executable computer code). As a result, the Elastic Layer (EL) 202 can effectively provide a virtual computing device capable of providing computing capabilities that can be extended dynamically and on demand far beyond the real capabilities of the hardware layer 204.

As noted above, a "Cloud" computing resource is an example of a dynamically scalable computing resource capable of providing computing services over the Internet using typically virtualized computing resources. It will be appreciated that the invention is especially suited for Web-based (or Web-centric) applications using "Cloud" computing technology.

Figure 3:
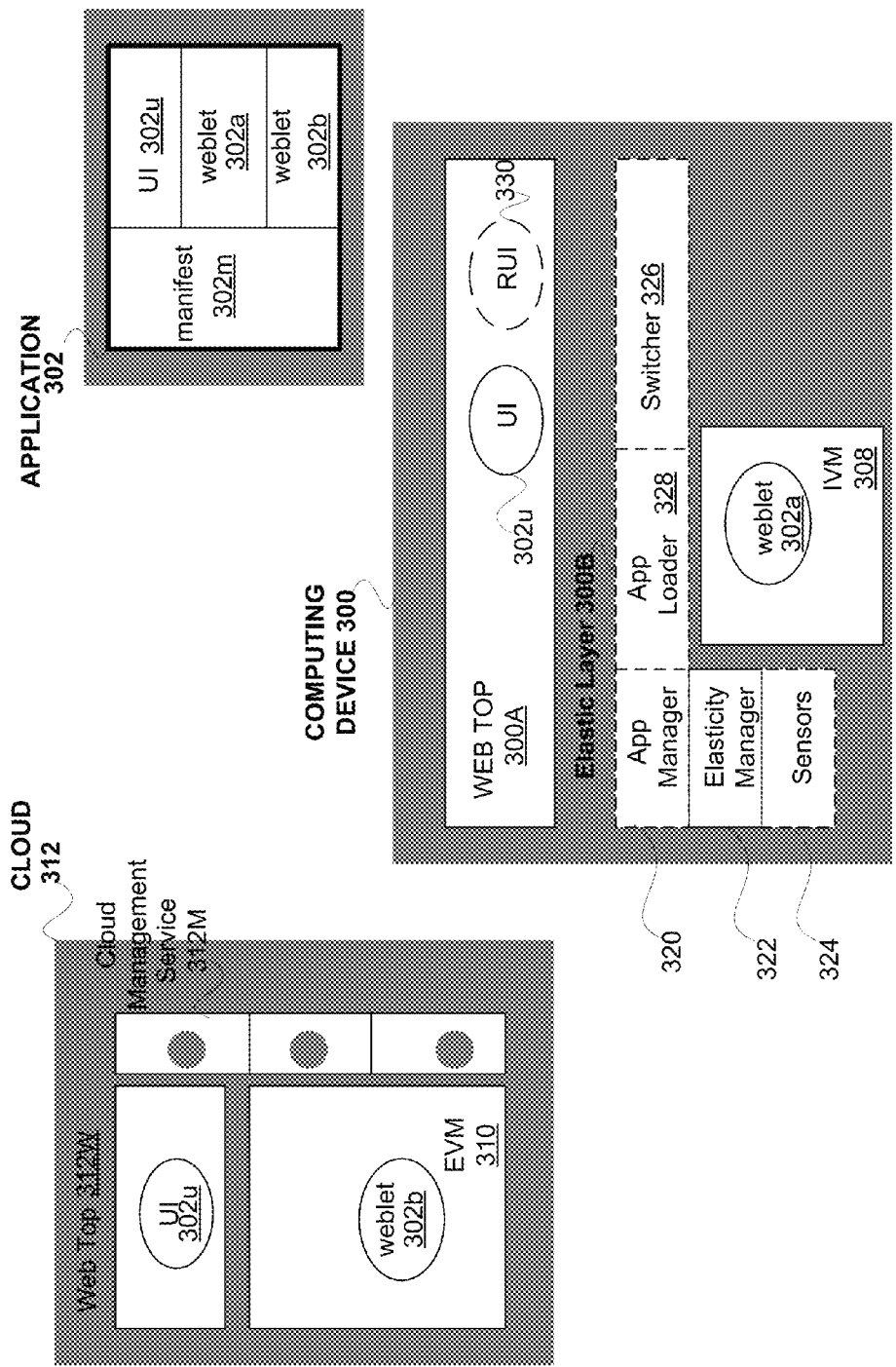
FIG. 3 depicts a computing device in a Web-based environment in accordance with one exemplary embodiment of the invention.

To further elaborate, FIG. 3 depicts a computing device 300 in a Web-based environment in accordance with one exemplary embodiment of the invention. Referring to FIG. 3, a Web-based application 302 can include a manifest 302*m*, a User Interface (UI) 302*u*, and a plurality of other application components 302*a* and 302*b*, as generally known in the art. Those skilled in the art will appreciate that as components of a Web-based application, components 302*a* and 302*b* can perform operations including, for example: responding to Hypertext Transfer Protocol (HTTP) requests, communicating with a single client and having a lifecycle bound to that of the client, executing locally or remotely. The components of a Web-based application (e.g., Web-based application 302) are referred to herein as "Weblets" (e.g., Weblets 302*a* and 302*b*). The manifest 302*m* can effectively provide a description of the web-based application 302. As such, the manifest 302*m* can, for example, provide information including the number of Weblets, format of Weblet requests, etc. Each of the Weblets 302*a* and 302*b* can be a part of an application and effectively encapsulate date state and the operations that can change the date state. A Weblet 302*a* can include executable code, for example, in the form of "bytecodes" that effectively expose an HTTP Interface to the User Interface, as will be readily known to those skilled in the art.

Those skilled in the art will also know that the computing device 300 can effectively provide a Web Top layer 300A (or component) effectively providing an environment for rendering and executing (or running) User Interface (UI) components, such as, the User Interface (UI) 302*u* of the web-based application 302. UI component 302*u* can, for example, be a browser, as generally known in the art.

Referring back to FIG. 3, the computing device 300 also includes an Elastic Layer (EL) 300B that may provide a number of components (or sub-components). In particular, an Application Manager (AM) 320 can be operable to initiate, or cause initiation of, one or more Virtual Computing Environments (VCEs), as one or more Internal Virtual Machines (IVMs) 308 in the computing device 300, and/or as one or more External Virtual Machines (EVM) 310 in a "Cloud" computing resource (or a "Cloud") 312. Each one of the IVM 308 and EVM 310 can effectively support the execution of a Weblet of the Web-based application 302. By way of example, the IVM 308 can effectively support the execution of the Weblet 302*a* when or while the EVM 310 effectively supports the execution of the Weblet 302*b*. Those skilled in the art will readily appreciate that these VCEs can, for example, be provided as an Application Virtual Machine, such as, a Java Virtual Machine (JVM), a Common Language Runtime (CLR), a Low Level Virtual Machine (LLVM), and others including those that an provide a complete operating system environment. The Application Manager (AM) 320 can manage an application and/or the execution of the application as a whole. As such, the Application Manager (AM) 320 can effectively serve as a higher level layer that communicates with a lower layer effectively provided by an Elasticity Manager (EM) 322 component operable to manage the individual Weblets.

In addition, the Application Manager (AM) 320 component of the Elastic Layer (EL) 300B can be operable to determine whether to initiate a VCE internally as an IVM 308, or cause initiation of a VCE externally as an EVM 310 on the "Cloud" 312. In other words, the Application Manager (AM) 320 component can be operable to determine whether to execute a particular Weblet (e.g., Weblet 302*a*, Weblet 302*b*) using the internal computing resources of the computing device 300 or external computing resources of the "Cloud" 312 which are dynamically scalable and can be provided on demand. The Application Manager (AM) 320 can be operable to make this determination based on the information provided by an Elasticity Manager (EM) 322. Generally, the Elasticity Manager (EM) 322 can be operable to monitor the environment of the computing device 300, including the computing environment of the computing device 300, and provide monitoring data to the Application Manager (AM) 320. The Elasticity Manager (EM) 322 component can, for example, monitor the environment (e.g., computing environment) of the computing device 300 based on data provided by sensors 324. Based on the data provided by the sensor and/or obtained from other sources, it can be determined whether to use of more of less of the external resources of the "Cloud" 312. As such, the Application Manager (AM) 320 may effectively initiate more EVMs on the "Cloud" 312 in order to, for example, move the execution of the Weblet 302a to the "Cloud" 312 and/or additionally execute a third Weblet of the Web-based application 302 (not shown) on an EVM of the "Cloud" 312.

It should be noted that a switcher component 326 can effectively connect the Weblets (or execution of the Weblets) 302a and 302b to the User Interface (UI) 302u regardless of whether the execution is supported entirely by the internal computing resources of the computing device 300, or the execution is supported at least partly by the external computing resources of the "Cloud" 312.

It should be noted that the "Cloud" 312 may have a Cloud Management Service (CMS) 312M that effectively manages services provided to various clients of the "Cloud" 312, including the computing device 300. More particularly, Elasticity Manager (EM) 322 can effectively interface with the CMS 312M in order to manage or co-manage one or more EVMs 310 provided by the "Cloud" 312 on behalf of computing device 300. In other words, the Elasticity Manager (EM) 322 can also be operable to serve as an interface to the "Cloud" 312 and manage and/or co-mange the computing environments of the "Cloud" 312 that pertain to the computing device 300.

In addition, the "Cloud" 312 may include other components. As shown in FIG. 3, "Cloud" 312 can provide a Web Top Environment 312W operable to effectively render and execute the User Interface (UI) 302u of the Web-based application 302. Moreover, the Elasticity Manager (EM) 322 may effectively request that the Application Manager (AM) 320 initiate the execution of the User Interface (UI) 302u by the "Cloud" 312. As a result, the User Interface (UI) 302u may be effectively rendered and executed in the Web Top Environment 312W of the "Cloud" 312. In that case, a Remote User Interface (RUI) 330 can be operable to communicate with the User Interface (UI) 302u being rendered and executed by the "Cloud" 312. The Remote User Interface (RUI) 330 may, for example, communicate user input data to the "Cloud" 312 and receive as output relatively simple instructions, such as, update display, and so on. As such, the Remote User Interface (RUI) 330 may be provided as a "thin client" or a "lightweight" User Interface while the UI logic is essentially performed by the "Cloud" 312.

It should be noted that the computing device 300 can include additional components. Referring to FIG. 3, an application loader 328 can be operable to load various components of the Web-based application 302 in a similar manner as a conventional application loader operates.

Moreover, it should be noted that the computing device 300 can be operable to dynamically adjust its usage of the external computing resources (or services) provided by the "Cloud" 312 at runtime when one or more of the Web-based application 302 are being executed. As such, the computing device 300 can behave as a dynamically adjustable (or Elastic) device. To further demonstrate the dynamic adaptability (or Elasticity) of the computing device 300, FIGS. 4A, 4B, 4C and 4D depict various configurations of a dynamically adjustable (or Elastic) computing device 300 in accordance with a number of embodiments of the invention.

Figure 4A:
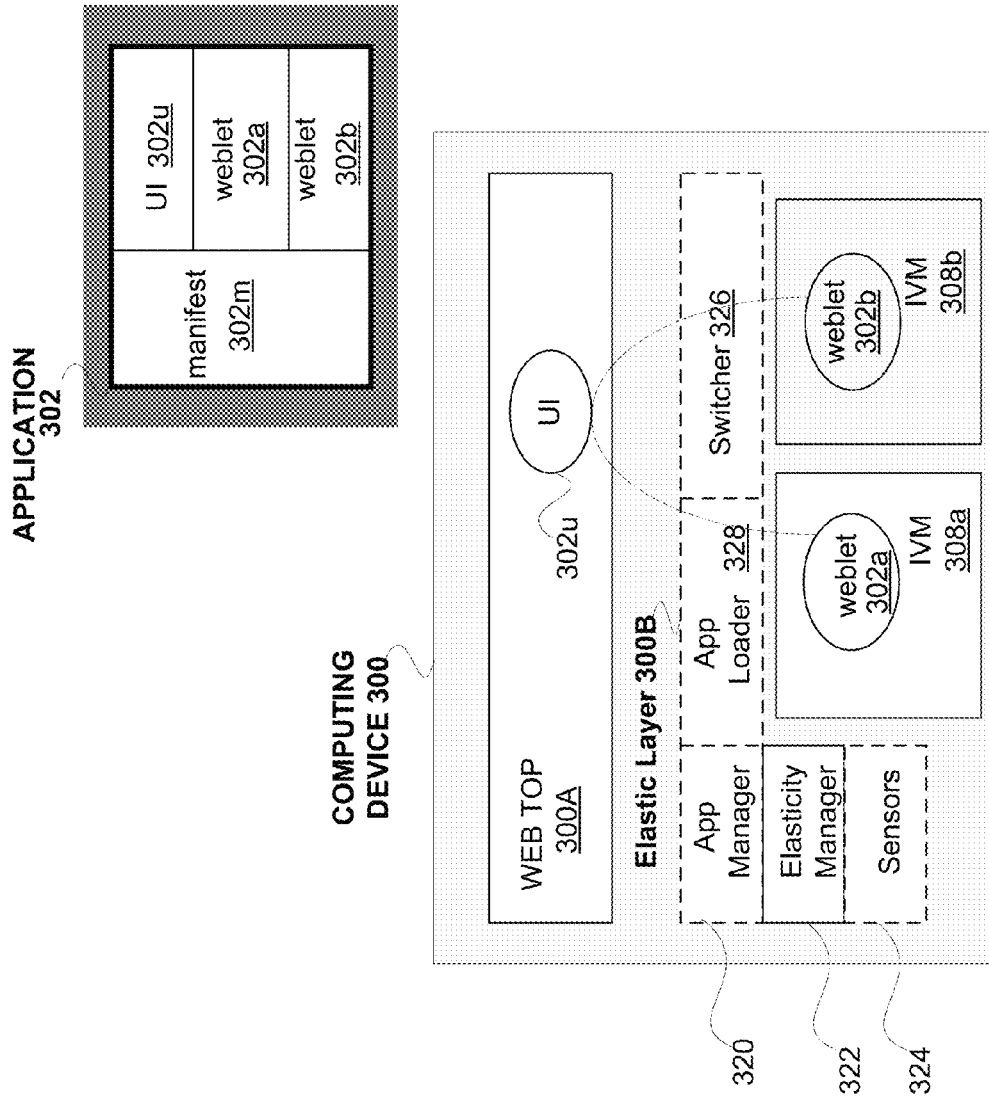
FIGS. 4A, 4B, 4C and 4D depict various configurations of a dynamically adjustable (or Elastic) computing device in accordance with a number of embodiments of the invention.
Figure 4B:
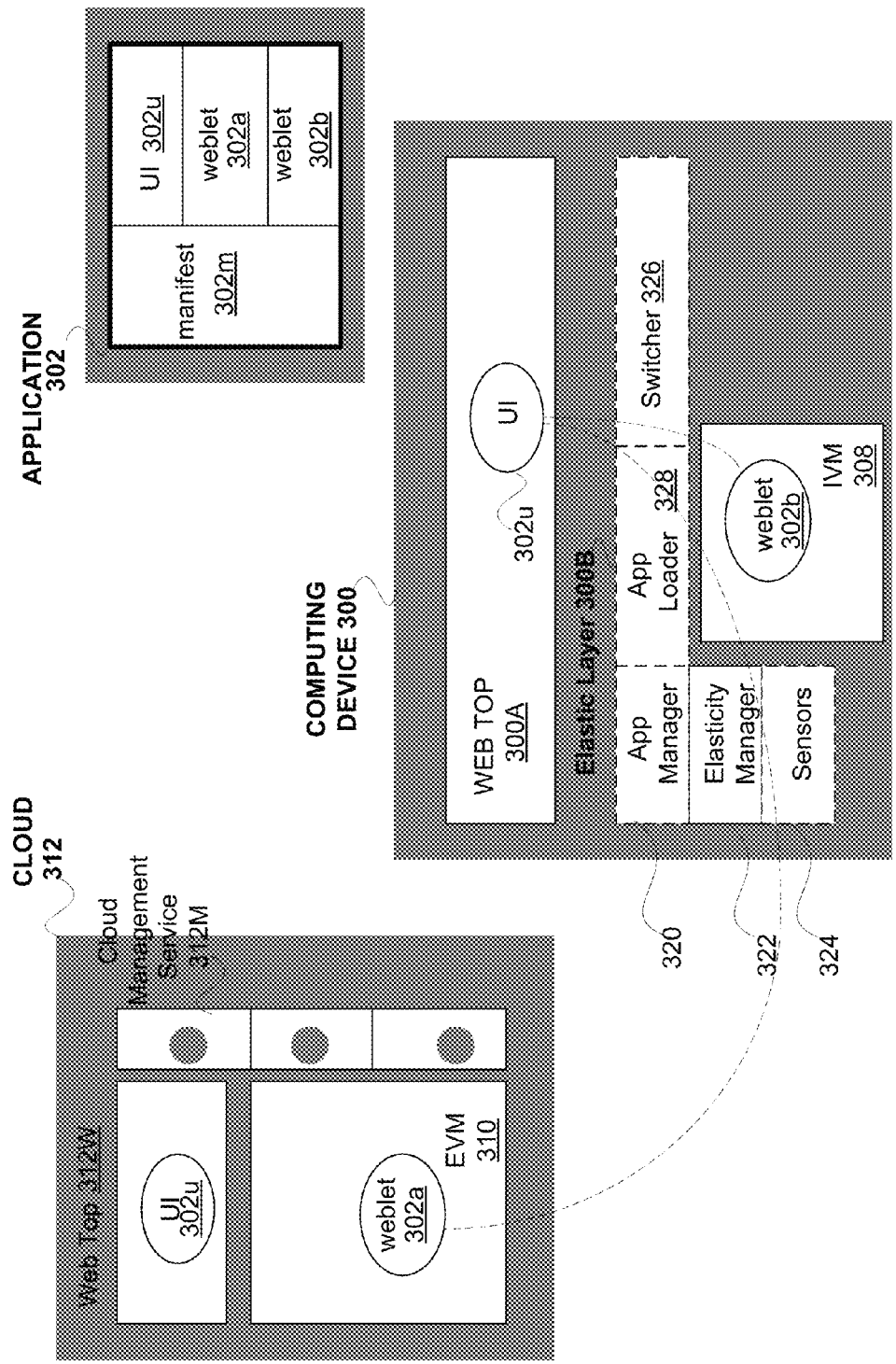
Figure 4C:
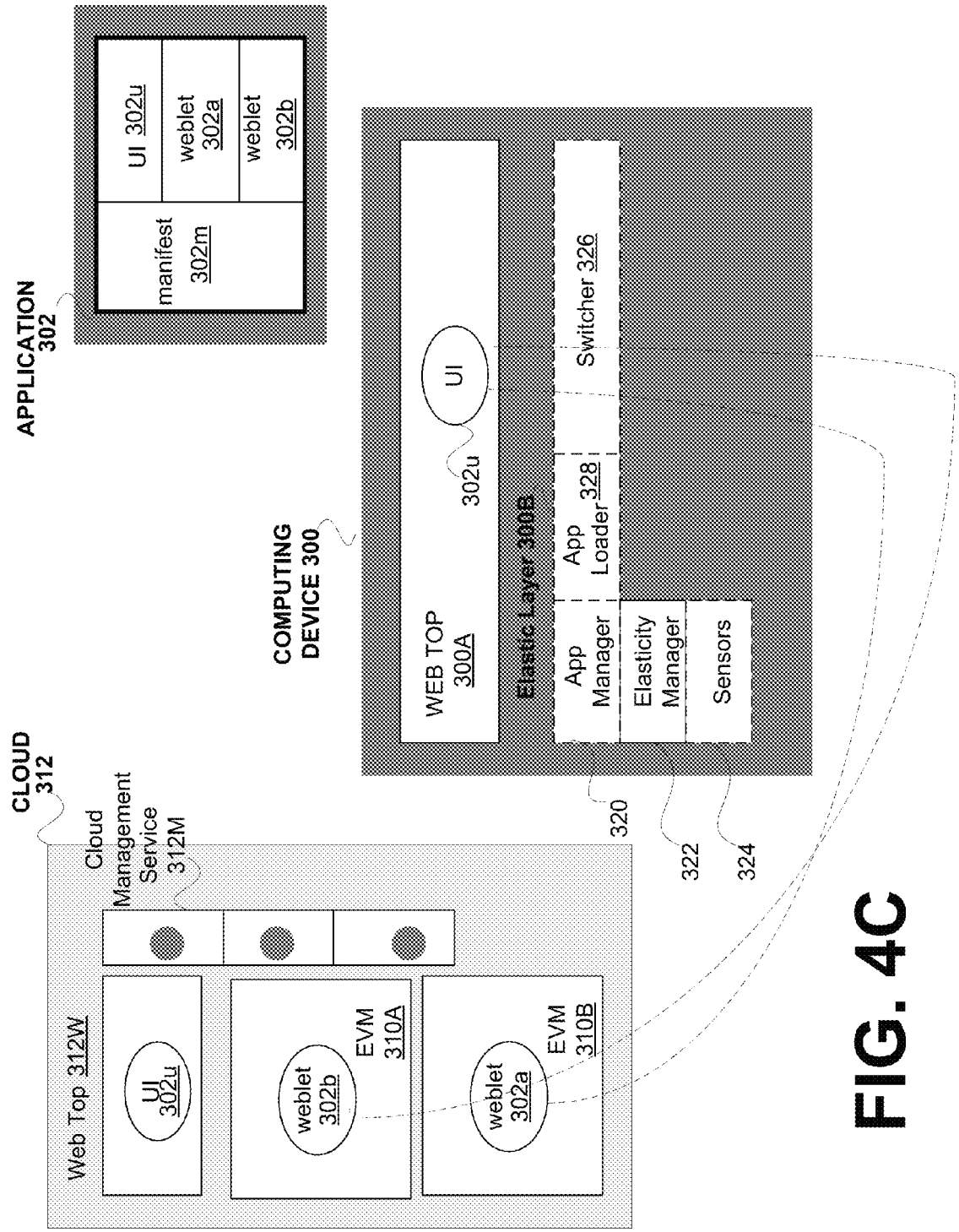
Figure 4D:
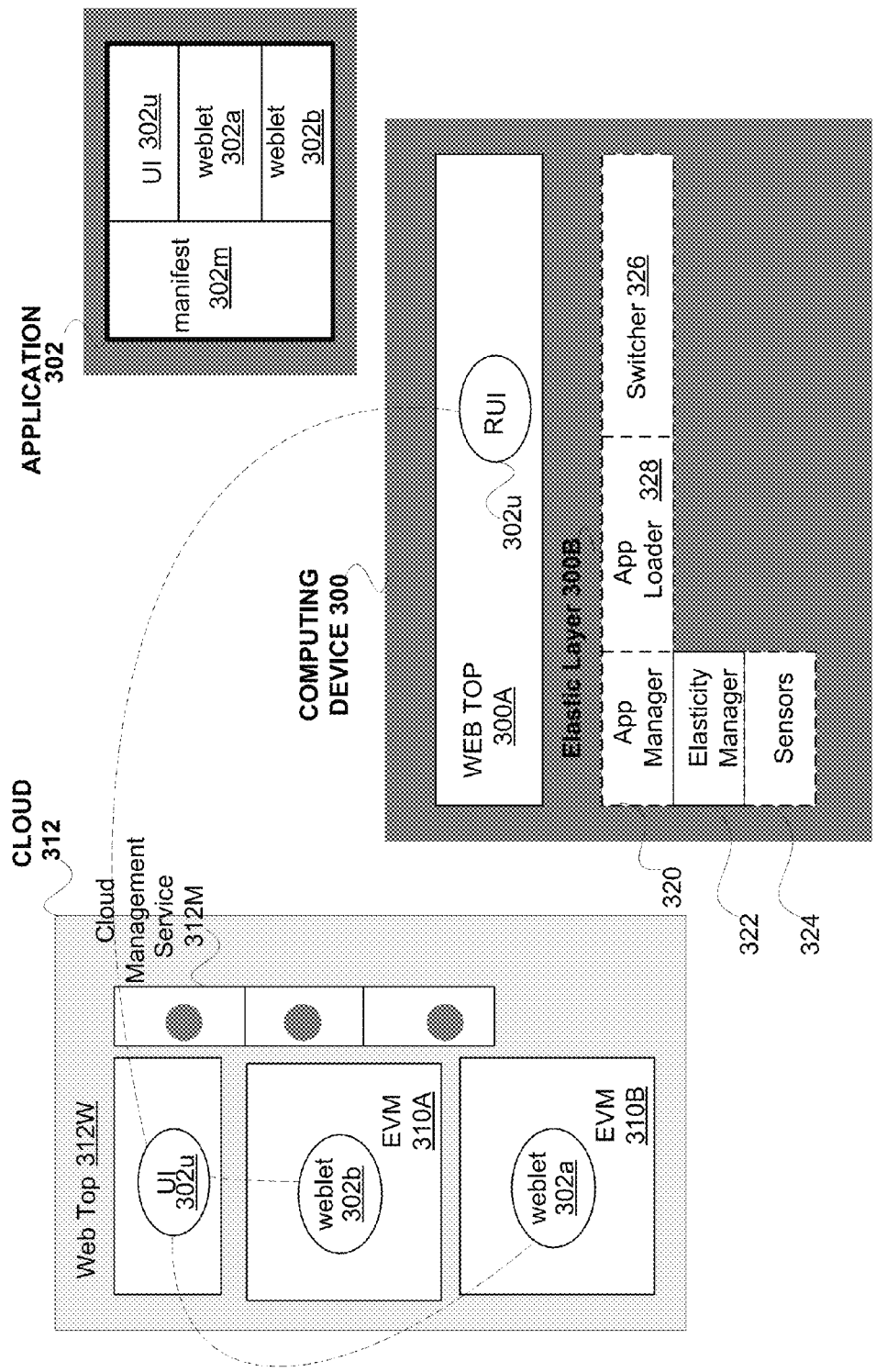

Referring to FIG. 4A, the computing device 300 (also shown in FIG. 3) may initially execute both Weblets 302a and 302b and execute and render the UI 302u using its own internal computing resources. However, if the internal computing resources are needed for other tasks, or other factors dictate preservation of the internal computing resources, the computing device 300 may use the services or the external computing resources of a "Cloud" 312, as shown in FIG. 4B. The factors that may dictate preservation of the internal computing resources can, for example, include the location of the computing device 300, the battery power, monetary cost associated with obtaining external computing services, network bandwidth available for obtaining external computing services, and so on. Referring now to FIG. 4B, execution of the Weblet 302a can be supported by the "Cloud" 312 instead of the computing device 300 while Weblet 302b and UI 302u are still executed using the internal computing resources of the computing device 300. Those skilled in the art will readily appreciated that the execution of the Weblet 302a can be effectively moved to the "Cloud" 312 by, for example, requesting its execution from "Cloud" 312 or effectively initiating its execution on "Cloud" 312. As a dynamically elastic device, the computing device 300 may still use more of the computing resources of the "Cloud" 312 during execution or run time. As shown in FIG. 4C, Weblet 302a and 302b can both be executed by the "Cloud" 312 while only the UI 302u is executed using the internal computing resources of the computing device 300. Subsequently, the execution of the UI 302u can even be effectively moved to the "Cloud" 312, as depicted in FIG. 4D. By way of example, the execution of the UI 302u can be requested from "Cloud" 312 or effectively initiated on "Cloud" 312 in order to effectively move the execution of UI 302u to "Cloud" 312.

Those skilled in the art will appreciate that Cloud Computing (CC) can, among other things, deliver infrastructure-as-a-service (IaaS), platform-as-a-service (PaaS), and software-as-a-service (SaaS). As a result, computing models for service providers and individual consumers that enable new IT business models, such as, for example, "resource-on-demand", pay-as-you-go, and utility-computing. In the case of consumer electronic (CE) devices, applications are traditionally constrained by limited and/or reduce resources, such as, for example, low CPU frequency, smaller memory, low network bandwidth, and battery powered computing environment. Cloud computing can be used to effectively remove the traditional constraints imposed on CE devices. Various "elastic" devices, including CE devices can be augmented with cloud-based functionality.

Figure 5:
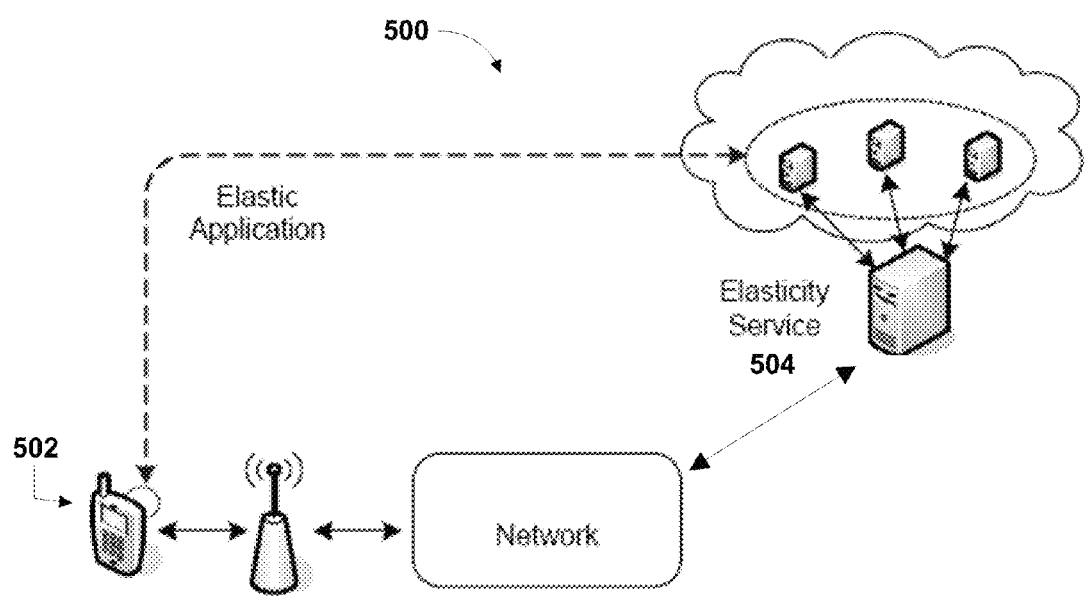
FIG. 5 depicts an elastic mobile device (or mobile terminal) operable to effectively consume cloud resources via an elasticity service in a computing/communication environment in accordance with one embodiment of the invention.

FIG. 5 depicts an elastic mobile device (or mobile terminal) 502 operable to effectively consume cloud resources via an elasticity service 504 in a computing/communication environment 500 in accordance with one embodiment of the invention. In the computing/communication environment 500, an elastic application can include of one or more weblets that can function independently, but can communicate with each other. When an elastic application is launched, an elastic manager on the mobile device 502 (not shown) can monitor the resource requirements of the weblets of the application, and make decisions as to where the weblets can and/or should be launched. By way of example, computation and/or communication extensive weblets, such as image and video processing, usually strain the processors of mobile devices. As such, an elastic manager can determine to launch computation and/or communication extensive weblets on one or more platforms in the cloud. On the other hand, User Interface (UI) components requiring extensive access to local data of the mobile device 502 may be launched by the elastic manager on the mobile device 502. When a weblet is to be launched on the cloud, the elastic manager can be operable to communicate with the elasticity service 504 residing on the cloud. The elasticity service 504, among other things, can be operable to make decisions regarding the execution of one or more weblet on the cloud. By way of example, the elasticity service 504 can determine on which cloud node a weblet can and/or should be launched, and how much storage can and/or should be allocated for the execution of the weblet on the cloud. The elasticity service can also be operable to return information back to the mobile device 502 after successfully launching the weblet (e.g., return an endpoint URL). In some situations, even with heavy computational tasks, execution on the device may be preferred and/or only possible. For example, when the mobile device 502 is unable to communicate with the elasticity service 504 (e.g., mobile device 502 is offline, media items to be executed are small in size or number, or fast response is not a requirement. In general, the mobile device 502 and the elasticity service 504 can "work together" to decide where and how various tasks can and/or should be executed. The elasticity service 504 can be operable to organize cloud resources and delegate various application requirements of multiple mobile devices including the mobile device 502. As a service provider, the elasticity service 504 may or may not be part of a cloud provider.

Furthermore, the elastic manager can be operable to make decisions regarding migrating weblets during run time (e.g., when weblets are being executed) between the device 502 and the cloud, based in various criteria, for example, including changes in the computing environment of the device 502 or changes in user preferences. It should be noted that the weblets of an application can be operable to communicate with each other during execution to exchange various information to, for example, synchronize the application state and exchange input/output data. As will be appreciated by those skilled in the art, communication between the weblets of the same application can, for example, be accomplished by a Remote Procedure Call (RPC) mechanism or using "RESTful" web services. The elasticity service 504 can organize cloud resources and delegates application requirements from various mobile devices including the mobile device 502. As a service provider, the elasticity service 504 may or may not be part of a cloud provider.

Those skilled in the art will readily appreciate that the mobile device 502 can, for example, represent an example of a computing device 300 depicted in FIG. 4, and the Elastic Service 504 can, for example, represent a Cloud Management Service 312 also depicted in FIG. 4.

It will also be appreciated that the computing/communication environment, among other things, allows development of applications (elastic applications) that can even better leverage cloud computing for mobile devices that have traditionally been resource constrained. The general concepts and benefits of elastic applications are disclosed in provisional patent application Ser. No. 61/222,855, entitled "SECURING ELASTIC APPLICATIONS ON MOBILE DEVICES FOR CLOUD COMPUTING," filed Jul. 2, 2009, which among other things, provides an elastic framework architecture, and elastic application model, a security model for elastic applications and elastic computing/communication environment.

In view of the foregoing, it will also be appreciated that the techniques described above, among other things, allow splitting an application program into sub-components (e.g., weblets spilt between an elastic device and a Cloud computing resource). This approach dramatically differs from conventional approaches including those that primarily focus on providing resources (e.g., Information Technology (IT) resources provided to them to enterprise IT infrastructures), traditional client/server model where computation can be initially and statically requested from a service provider (e.g., a server), whereby most, if not all, of the computation is done by the service provider. In stark contrast, the invention allows computation to be done based on application components (e.g., individual weblets) and allows each application component to be executed by a different entity and in a different location. As such, the invention allows an application model that need not distinguish between clients and servers, but can distinguish between individual components of a single application. The invention also provides device or client based techniques and solutions that have not been addressed by conventional approaches, which have been primarily focused on providing resources from the perspective of a resource or service provider. Again, it should be noted that the techniques of the inventions are especially and highly suited for mobile devices that have been traditionally constrained by limited computing capabilities due to their limited and/or reduced computing resources. Conventional techniques do not provide a practical and feasible solution allowing mobile devices to effectively split execution of applications between in a dynamic manner, thereby allowing execution of an application to be split during runtime in a manner deemed more appropriate at a given time, and yet split differently later but still during the runtime of the same application.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:
1. A computing device, comprising:
a computer processor;
one or more internal computing resources; and
wherein said computing device is operable to:
   determine, during runtime of executable computer code, whether to execute, or continue to execute, one or more portions of said executable computer code on one or more external computing resources including a dynamically scalable computing resource, thereby dynamically determining during runtime relative extent of allocation of execution of said executable computer code between said internal computing resources of said computing device and said one or more external computing resources; and
   provide said one or more portions of said executable computer code to said one or more external computing resources for execution when said computing device determines to execute said one or more portions of said executable computer code on said one or more external computing resources;

wherein said computing device is configured to:
coordinate execution of said one or more portions of said executable computer code when said one or more portions are provided to at least one external computing resource for execution; and
generate a collective result of said execution of said one or more portions when said one or more portions are provided to said at least one external computing resource for execution, wherein said collective result is provided such that a user is unaware that said one or more portions are provided to said at least one external computing resource for execution.

2. The computing device as recited in claim 1, wherein:
said computing device is further operable to at least one of initiate and cause initiation of at least one Run Time Environment for providing said one or more portions of said executable code to said one or more external computing resources for execution; and
said Run Time Environment is initiated on at least one of said computing device and said one or more external computing resources.

3. The computing device as recited in claim 2, wherein said Run Time Environment includes a Virtual Computing Environment on said one or more external computing resources that effectively provide one or more external virtual computing resources for execution of said executable computer code.

4. The computing device as recited in claim 3, wherein said one or more external virtual computing resources are effectively provided over the Internet as at least one of a "Cloud" computing resource or service.

5. The computing device as recited in claim 4, wherein said "Cloud" computing resource or service is provided as at least one of a service, Platform as a Service, and a Software as a Service over the Internet using a Web-based computer application program.

6. The computing device as recited in claim 3, wherein said one or more external virtual computing resources provide at least one of a service, a Platform as a Service, and a Software as a Service to said computing device.

7. The computing device as recited in claim 1, wherein said computing device is further operable to:
effectively coordinate execution of a first portion of said executable computer code using said internal computing resources with providing at least a second portion of said executable computer code to said one or more external computing resources for execution, thereby executing said executable computer code in a coordinated manner; and
provide said collective result such that a user is unaware that said second portion is provided to said one or more external computing resources for execution.

8. The computing device as recited in claim 7, wherein said computing device is further operable to:
generate first output data based on execution of said first portion by said internal computing resources; and
generate second output data based on execution of said second portion when said second portion is provided to said one or more external computing resources for execution, thereby making available on said computing device both said first and second output data as a collective result of execution of said first and second portions of said executable computer code.

9. The computing device as recited in claim 1, wherein:
said dynamically scalable computing resource is operable to provide said one or more external computing resources on demand and as needed to allow execution of at least first and second portions of said executable computer code; and
said computing device is further operable to:
execute a first portion of said executable computer code using said internal computing resources; and
provide a second portion of said executable computer code to said dynamically scalable computing resource for execution.

10. The computing device as recited in claim 9, wherein said computing device is further operable to perform one or more of the following:
provide a third portion of said executable computer code to said one or more external computing resources for execution when said first and second portions of said executable computer code are being executed;
initiate execution of said third portion of said executable computer code on said one or more external computing resources when said first and second portions of said executable computer code are being executed;
effectively relocate execution of said second portion of said executable computer code from said dynamically scalable computing resource to one or more of said internal computing resources; and
effectively relocate execution of said first portion of said executable computer code from said internal computing resources to said one or more external computing resources.

11. The computing device as recited in claim 1, wherein said computing device determines whether to execute said one or more portions of said executable computer code on said one or more external computing resources when one or more of the following occurs:
one or more portions of said executable computer code is to be loaded for execution,
one or more portions of said executable computer code is to be executed,
one or more portions of said executable computer code is being executed by one or more of said internal computing resources of said device, and
one or more portions of said executable computer code is being executed by said one or more external computing resources.

12. The computing device as recited in claim 1, wherein said computing device determines whether to execute said one or more portions of said executable computer code on said one or more external computing resources without requiring user input, thereby automatically determining said relative extent of allocation of execution of said executable computer code between said one or more internal computing resources and said one or more external computing resources.

13. The computing device as recited in claim 1, wherein said computing device determines whether to execute said one or more portions of said executable computer code on said one or more external computing resources based on one or more criteria including one or more of the following:
said internal computing resources, said one or more external computing resources, communication between said internal computing resources and said one or more external computing resources, physical resources associated with said computing device, environmental factors including physical location of said computing device, and said executable computer code.

14. The computing device as recited in claim 1, wherein said computing device is further operable to at least one of increase and decrease extent of providing said one or more portions of said executable code to said one or more external computing resources for execution.

15. The computing device as recited in claim 1, wherein said computing device is further operable to at least one of increase and decrease extent of providing said one or more portions of said executable code to said one or more external computing resources for execution during runtime of said executable computer code, thereby dynamically providing more or fewer portions of said executable computer code to said one or more external computing resources for execution during runtime of said executable computer code.

16. The computing device as recited in claim 1, wherein:
said one or more portions of said executable computer code comprise one or more re-locatable code portions; and
said computing device is further operable to effectively relocate said one or more re-locatable code portions from said computing device to said one or more external computing resources, or vice versa, during runtime of said executable computer code.

17. The computing device as recited in claim 1, wherein said one or more portions of said executable computer code are one or more replicable code portions.

18. The computing device of claim 1, wherein said computing device is further operable provide at least two portions of said executable computer code to two nodes of said one or more external computing resources for execution.

19. The computing device of claim 1, wherein said computing device is further operable to provide at least two processes associated with said executable computer code to two separate computing nodes of said one or more external computing resources for execution.

20. The computing device of claim 1, wherein said computing device is further operable to provide said one or more portions of said executable computer code to said one or more external computing resources for execution to an extent that said one or more external computing resources can make computing resources available to said computing device.

21. The computing device as recited in claim 1, wherein said computing device is further operable to:
provide said one or more portions of said executable computer code to said one or more external computing resources for execution without copying any operating environment of said computing device.

22. The computing device as recited in claim 1, wherein:
said dynamically scalable computing resource is an abstract and dynamically scalable computing resource, and
said computing device is further operable to provide a second portion of said executable computer code to a specific external computing resource of said abstract and dynamically scalable computing resource for execution without specifically addressing said specific external computing resource.

23. The computing device as recited in claim 1, wherein:
said one or more internal computing resources are relatively reduced with respect to said one or more external computing resources; and
said computing device is further operable to at least one of effectively facilitate, initiate, cause and resume execution of one or more portions of said executable computer code at runtime in a dynamic manner to effectively extend computing capabilities of said computing device at least ten times beyond internal computing capabilities of said internal computing resources.

24. The computing device as recited in claim 1, wherein said computing device is one or more of the following: a Consumer Electronic device, a Consumer Electronic device with at least one of a reduced Operating System and a specialized Operating System, a Consumer Electronic device with an Operating System specialized for at least one of browsing the Web and handling Web-based applications including a plurality of Weblets, a mobile device, a mobile device with at least one of a reduced Operating System and a specialized Operating System, a mobile device with an Operating System specialized for at least one of browsing the Web for and handling Web-based applications including a plurality of Weblets, a mobile handheld device, a mobile handheld device with at least one of a reduced Operating System and a specialized Operating System, a mobile handheld device with an Operating System specialized for at least one of browsing the Web and handling Web-based applications including a plurality of Weblets, an electrical appliance, an electrical appliance with at least one of a reduced Operating System and a specialized Operating System, an electrical appliance with an Operating System specialized for at least one of browsing the Web and handling Web-based applications including a plurality of Weblets, a Television, a home appliance.

25. The computing device as recited in claim 1, wherein:
said one or more internal computing resources include one or more of the following: one or more processors, memory, non-volatile memory, a computer readable storage medium, and RAM memory; and
said one or more external computing resources include one or more of the following: one or more processors, memory, non-volatile memory, computer readable storage medium, and RAM memory.

26. The computing device as recited in claim 1, wherein said executable computer code includes one or more of the following:
a computer application program, an Applet, a Web-based application, and a Web-based application including a plurality of Weblets.

27. The computing device as recited in claim 1, wherein said computing device is further operable to perform one or more of the following:
effectively switch execution of a first portion of said executable computer code from said internal computing resources to said one or more external computing resources;
effectively switch execution of a second portion of executable computer code from said internal computing resources to said one or more external computing resources; and
provide a third portion of said executable computer code to said one or more external computing resources for execution before execution of said first or second portion has ended.

28. The computing device as recited in claim 1, wherein said computing device determines whether to execute said one or more portions of said executable computer code on said one or more external computing resources based on one or more of the following:
one or more capabilities of said internal computing resources, monetary cost associated with using said one or more external computing resources, expected or expectable latency for delivering services by said one or more external computing resources, network bandwidth for communication with said one or more external computing resources, status of one or more physical resources, current battery power of said computing device, one or more environmental factors, physical location of said computing device, number of applications being executed on said computing device, and types of applications being executed or to be executed on said computing device.

29. The computing device as recited in claim 1, wherein said computing device is further operable to: vary said extent of allocation during run time such that said executable code is executed using only said internal computing resources or is provided to said one or more external computing resources for execution.

30. The computing device as recited in claim 1, wherein said computing device is further operable to: vary said extent of allocation, during run time, so that said executable computer code is executed using only said internal computing resources or is provided to at least one external computing resource for execution.

31. The computing device as recited in claim 1, wherein said computing device is further operable to: vary said extent of allocation, during run time, between allocation stages including: an internal allocation stage when said executable computer code is executed entirely using only said internal computing resources, a split allocation stage when at least one portion of said executable computer code is provided to at least one external computing resource for execution, and an external allocation stage when all of said executable computer code is provided to said one or more external computing resources for execution.

32. The computing device as recited in claim 1, wherein:
said computing device is further operable to at least one of initiate and cause initiation of at least one Virtual Environment for providing said one or more portions of said executable computer code to said one or more external computing resources for execution; and
said Virtual Environment is initiated on at least one of said computing device and said one or more external computing resources.

33. A method for a computing system including one or more internal computing resources, the method comprising:
determining, during runtime of executable computer code, whether to execute or continue to execute one or more portions of said executable computer code on a dynamically scalable computing resource instead of using said internal computing resources, thereby determining relative extent of allocation of execution of said executable computer code between said internal computing resources and one or more external computing resources of said dynamically scalable computing resource dynamically during runtime;
providing said one or more portions of said executable computer code to said one or more external computing resources for execution when it is determined to execute said or more portions of said executable computer code on said one or more external computing resources; and
coordinating execution of said one or more portions of said executable computer code when said one or more portions are provided to at least one external computing resource for execution, wherein a collective result of said execution of said one or more portions is generated when said one or more portions are provided to said at least one external computing resource for execution, and wherein said collective result is provided such that a user is unaware that said one or more portions are provided to said at least one external computing resource for execution.

34. The method as recited in claim 33, wherein said method further comprises:
coordinating (a) execution of at least a first portion of said executable computer code using said internal computing resources of said computing system with (b) providing a second portion of said executable computer code to said one or more external computing resources for execution; and
generating, based on said coordinating, a collective result of said executions of said first and second portions of said executable computer code, thereby making available said collective result on said computing system.

35. The method as recited in claim 34, wherein said coordinating of said execution comprises:
generating a first output based on execution of said first portion of said executable computer code; and
generating a second output based on execution of said second portion of said executable computer code.

36. The method as recited in claim 34, wherein said coordinating of said execution further comprises one or more of the following:
determining when to effectively initiate execution of said second portion of said executable computer code;
determining when to effectively initiate execution of said first portion of said executable computer code;
selecting said dynamically scalable computing resource from a set of dynamically scalable computing resources; and
selecting said one or more external computing resources from a set of external computing resources.

37. The method as recited in claim 34, wherein said coordinating of said execution further comprises one or more of the following:
determining a location for sending a request for execution of said second portion of said executable computer code;
sending to said location said request for execution of said second portion of said executable computer code; and
obtaining from said location execution result of said execution of said second portion of said executable computer code.

38. The method as recited in claim 34, wherein providing a second portion of said executable computer code to said one or more external computing resources for execution comprises:
providing said second portion of said executable computer code to said one or more external computing resources before execution of said first portion by said internal computing resources has completed, thereby allowing said computing system to effectively extend its internal computing capabilities at execution time by using external computing capabilities that can be delivered dynamically.

39. The method as recited in claim 33, wherein said computer-implemented method further comprises one or more of the following:
effectively switching execution of said first portion of executable computer code from said internal computing resources to said one or more external computing resources;
effectively switching execution of said second portion of executable computer code from said internal computing resources to said one or more external computing resources; and
providing a third portion of said executable computer code to said one or more external computing resources for execution before execution of said first portion on said internal computing resources has ended.

40. A non-transitory computer readable storage medium storing at least a first executable computer code that when executed by a computing device causes said computing device to:

determine, during runtime of a second executable computer code, whether to execute one or more portions of said second executable computer code by effectively using a dynamically scalable computing resource, thereby dynamically determining during runtime relative extent of allocation of execution of said second executable computer code between internal computing resources of said computing device and external computing resources of said dynamically scalable computing resource;

providing said one or more portions of said second executable computer code to said one or more external computing resources for execution when it is determined to execute said one or more portions of said second executable computer code on said one or more external computing resources; and coordinating execution of said one or more portions of said executable computer code when said one or more portions are provided to at least one external computing resource for execution, wherein a collective result of said execution of said one or more portions is generated when said one or more portions are provided to said at least one external computing resource for execution, and wherein said collective result is provided such that a user is unaware that said one or more portions are provided to said at least one external computing resource for execution.

41. A dynamically scalable computing resource operable to effectively provide a computing device one or more external computing resources for execution of one or more portions of executable computer code when said computing device determines and requests, during runtime of said executable computer code, to execute said one or more portions of said executable computer code on said one or more computing external computing resources of said dynamically scalable computing resource, thereby dynamically providing said computing device during runtime of said executable code said one or more external computing resources to an extent determined by said computing device;

wherein said computing device is configured to:
coordinate execution of said one or more portions of said executable computer code when said one or more portions are provided to at least one external computing resource for execution; and generate a collective result of said execution of said one or more portions when said one or more portions are provided to said at least one external computing resource for execution, wherein said collective result is provided such that a user is unaware that said one or more portions are provided to said at least one external computing resource for execution.

42. A communication system, comprising:
a computing device, including:
one or more internal computing resources; and
wherein said computing device is operable to:
determine, during runtime of executable computer code, whether to execute, or continue to execute, one or more portions of said executable computer code on one or more external computing resources including a dynamically scalable computing resource, thereby dynamically determining during runtime relative extent of allocation of execution of said executable computer code between said internal computing resources of said computing device and said one or more external computing resources; and provide said one or more portions of said executable computer code to said one or more external computing resources for execution when said computing device determines to execute said one or more portions of said executable computer code on said one or more external computing resources; and wherein said computing device is configured to:
coordinate execution of said one or more portions of said executable computer code when said one or more portions are provided to at least one external computing resource for execution; and generate a collective result of said execution of said one or more portions when said one or more portions are provided to said at least one external computing resource for execution, wherein said collective result is provided such that a user is unaware that said one or more portions are provided to said at least one external computing resource for execution.

* * * * *